United States Patent
Nakamura

(10) Patent No.: US 7,999,863 B2
(45) Date of Patent: Aug. 16, 2011

(54) IMAGE CORRECTION APPARATUS AND METHOD

(75) Inventor: Tomokazu Nakamura, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1217 days.

(21) Appl. No.: 11/700,228

(22) Filed: Jan. 31, 2007

(65) Prior Publication Data

US 2007/0177038 A1      Aug. 2, 2007

(30) Foreign Application Priority Data

Feb. 1, 2006   (JP) .................................. 2006-024014

(51) Int. Cl.
 *H04N 5/217* (2011.01)
 *H04N 9/73* (2006.01)
 *G06K 9/00* (2006.01)
 *G06K 9/40* (2006.01)

(52) U.S. Cl. .................. 348/241; 348/223.1; 348/225.1; 382/118; 382/254; 382/274

(58) Field of Classification Search .................. 348/241, 348/222.1, 254, 255, 223.1; 382/118, 254, 382/274, 275
See application file for complete search history.

(56) References Cited

U.S. PATENT DOCUMENTS

| | | | | |
|---|---|---|---|---|
| 5,745,172 A * | 4/1998 | Miyashita | ..................... | 348/241 |
| 7,092,573 B2 * | 8/2006 | Luo et al. | ..................... | 382/228 |
| 7,593,585 B2 * | 9/2009 | Ishida | ........................... | 382/118 |
| 2004/0051790 A1 * | 3/2004 | Tamaru et al. | ............. | 348/223.1 |
| 2004/0080634 A1 * | 4/2004 | Sakamoto et al. | ............ | 348/241 |
| 2004/0091145 A1 | 5/2004 | Kohashi et al. | | |
| 2004/0135898 A1 * | 7/2004 | Zador | ........................ | 348/222.1 |
| 2005/0073592 A1 * | 4/2005 | Aotsuka | ..................... | 348/224.1 |
| 2005/0200736 A1 * | 9/2005 | Ito | ............................. | 348/333.01 |
| 2006/0008145 A1 * | 1/2006 | Kaku | ........................... | 382/173 |

FOREIGN PATENT DOCUMENTS

| | | | |
|---|---|---|---|
| JP | 60-139080 A | | 7/1985 |
| JP | 06-289810 | * | 10/1994 |
| JP | 07-212628 | * | 8/1995 |
| JP | 11-32236 A | | 2/1999 |
| JP | 2001-27890 A | | 1/2001 |
| JP | 2001-186378 A | | 7/2001 |
| JP | 2002-354384 A | | 12/2002 |
| JP | 2003-283878 A | | 10/2003 |
| JP | 2003-304549 A | | 10/2003 |
| JP | 2006-18465 A | | 1/2006 |
| JP | 2006-19928 A | | 1/2006 |

* cited by examiner

*Primary Examiner* — Nhan T Tran
(74) *Attorney, Agent, or Firm* — Birch, Stewart, Kolasch & Birch, LLP

(57) ABSTRACT

When the image of a face is detected from within the image of a subject, the brightness of the face image is calculated. If it is determined that the face image is dark are requires a correction, a revised gamma correction curve is calculated in such a manner that both the face image and the overall image of the subject take on the appropriate brightness. A gamma correction is applied using the revised gamma correction curve. Noise reduction processing is executed in order to suppress the amount of noise produced by the gamma correction.

8 Claims, 22 Drawing Sheets

*Fig. 11*

| AMOUNT OF NOISE | ~5 | 6~10 | 11~15 | 16~20 | 21~25 | 26~30 | 31~ |
|---|---|---|---|---|---|---|---|
| FILTER COEFFICIENTS | $n\_11\_1 \sim n\_nn\_1$ | $n\_11\_2 \sim n\_nn\_2$ | $n\_11\_3 \sim n\_nn\_3$ | $n\_11\_4 \sim n\_nn\_4$ | $n\_11\_5 \sim n\_nn\_5$ | $n\_11\_6 \sim n\_nn\_6$ | $n\_11\_7 \sim n\_nn\_7$ |

Fig. 16A

| SLOPE ANGLE θ [°] | ~59 | 60~65 | 66~70 | 71~80 | 81~90 |
|---|---|---|---|---|---|
| n (FILTER SIZE) | $n\_1$ | $n\_2$ | $n\_3$ | $n\_4$ | $n\_5$ |

Fig. 16B

| SLOPE ANGLE θ [°] | ~59 | 60~65 | 66~70 | 71~80 | 81~90 |
|---|---|---|---|---|---|
| FILTER COEFFICIENTS | $n\_{1\_1}$~$n\_{m\_1}$ | $n\_{1\_2}$~$n\_{m\_2}$ | $n\_{1\_3}$~$n\_{m\_3}$ | $n\_{1\_4}$~$n\_{m\_4}$ | $n\_{1\_5}$~$n\_{m\_5}$ |

Fig. 18A

| DIFFERENCE QUANTITY ΔL | 0~5 | 6~15 | 16~30 | 31~45 | 46~ |
|---|---|---|---|---|---|
| n (FILTER SIZE) | $n\_1$ | $n\_2$ | $n\_3$ | $n\_4$ | $n\_5$ |

Fig. 18B

| DIFFERENCE QUANTITY ΔL | 0~5 | 6~15 | 16~30 | 31~45 | 46~ |
|---|---|---|---|---|---|
| FILTER COEFFICIENTS | $n\_{11\_1} \sim n\_{m\_1}$ | $n\_{11\_2} \sim n\_{m\_2}$ | $n\_{11\_3} \sim n\_{m\_3}$ | $n\_{11\_4} \sim n\_{m\_4}$ | $n\_{11\_5} \sim n\_{m\_5}$ |

Fig. 20

| SLOPE ANGLE θ [°] | 0~59 | 60~65 | 66~70 | 71~80 | 81~90 |
|---|---|---|---|---|---|
| THRESHOLD VALUE | $th_{\_1}$ | $th_{\_2}$ | $th_{\_3}$ | $th_{\_4}$ | $th_{\_5}$ |

Fig. 21

| DIFFERENCE QUANTITY ΔL | 0~5 | 6~15 | 16~30 | 31~45 | 46~ |
|---|---|---|---|---|---|
| THRESHOLD VALUE | $th_{\_1}$ | $th_{\_2}$ | $th_{\_3}$ | $th_{\_4}$ | $th_{\_5}$ |

IMAGE CORRECTION APPARATUS AND METHOD

BACKGROUND OF THE INVENTION

1. Field of the Invention

This invention relates to an image correction apparatus and method.

2. Description of the Related Art

There are occasions where noise reduction processing is executed in order to reduce noise in the image of a subject. For example, there is prior art that reduces noise increased by gain processing and offset processing when contrast is improved without changing visual average luminance (see the specification of Japanese Patent Application Laid-Open No. 2001-27890). Further, there is prior art that diminishes the conspicuousness of random noise increased when a gain adjustment is utilized to correct a difference in level in terms of an optical black level (see the specification of Japanese Patent Application Laid-Open No. 2002-354384).

Furthermore, there is prior art in which when a specific area that is part of an image is printed, a gamma conversion that has been adapted to the specific area is performed in order to improve the tone of the specific area (see the specification of Japanese Patent Application Laid-Open No. 60-139080).

Printers and the like that detect the image of a face from within the image of a subject and brighten the detected face image are being sold. However, merely brightening the overall image of the subject in-order to brighten the portion that is the face image can result in the background becoming too bright. This in turn can result in an imbalance between the face image and the background.

SUMMARY OF THE INVENTION

Accordingly, an object of the present invention is to improve the balance between the brightness of a target image such as a face image and the brightness of a background image.

According to the present invention, the foregoing object is attained by providing an image correction apparatus comprising: a brightness correcting device (means) for correcting subject image data, which represents the image of a subject, in such a manner that the brightness of a target image, which is one portion within the image of the subject, will take on a prescribed target value; a noise reduction parameter deciding device (means) for deciding a noise reduction parameter based upon an amount of correction in the brightness correcting device (means); and a noise reducing device (means) for applying noise reduction processing to the subject image data, which has been corrected by the brightness correcting device (means), based upon the noise reduction parameter decided by the noise reduction parameter deciding device (means).

The present invention also provides an image correction method suited to the above-described image correction apparatus. Specifically, an image correction method according to the present invention comprises the steps of: correcting subject image data, which represents the image of a subject, in such a manner that the brightness of a target image, which is one portion within the image of the subject, will take on a prescribed target value; deciding a noise reduction parameter based upon an amount of correction in the correction of subject image data; and applying noise reduction processing to the corrected subject image data based upon the noise reduction parameter decided.

In accordance with the present invention, subject image data representing the image of a subject is subjected to a brightness correction in such a manner that the brightness of a target image (e.g., the image of a face or eye) that is a portion of the subject image will take on a prescribed value. The target image comes to possess the appropriate brightness owing to the brightness correction. A noise reduction parameter is decided based upon the amount of correction applied in the brightness correction. The subject image data that has undergone the brightness correction is subjected to noise reduction processing based upon the noise reduction parameter decided. Since the image of the subject undergoes noise reduction processing in accordance with the amount of correction of brightness of the subject image, any increase in noise in the image of the subject caused by the brightness correction will be suppressed. A target image having the appropriate brightness is obtained, and a subject image having little noise also is obtained.

The noise reduction parameter deciding device can decide the noise reduction parameter based upon amount of noise possessed by the subject image data and the amount of correction applied in the brightness correcting device, by way of example. Noise possessed by the subject image data prevailing prior to the brightness correction can also be suppressed.

The apparatus may further comprise a target image detecting device (means) for detecting the target image from within the image of the subject. In this case the brightness correcting device would correct the subject image data in such a manner that the brightness of the target image detected by the target image detecting device will take on the appropriate target value.

The brightness correcting device is, e.g., a gamma correction circuit for applying a gamma correction to the subject image data based upon a revised gamma correction curve according to which the brightness of the target image takes on the prescribed target value.

The apparatus may further comprise a first histogram calculating device (means) for calculating a histogram (a brightness distribution diagram) of image data obtained in a case where the target image data has been subjected to the gamma correction using a basic gamma correction curve; a threshold value deciding device (means) for deciding a threshold value based upon the histogram calculated by the first histogram calculating device; a revised gamma correction curve calculating device (means) for calculating a revised gamma correction curve based upon an ideal value of brightness of the target image; a second histogram calculating device (means) for calculating a histogram of image data obtained in a case where the target image data has been subjected to the gamma correction using the revised gamma correction curve calculated by the revised gamma correction curve calculating device; and a loop control device (means) for executing processing that lowers the level of the ideal value until a peak value of the histogram calculated by the second histogram calculating device falls below the threshold value decided by the threshold value deciding device, and controlling the revised gamma correction curve calculating device and second histogram calculating device so as to repeat revised correction curve calculation processing that is based upon the ideal value whose level has been lowered and gamma correction processing that uses the revised correction curve. In this case, the ideal value at which the peak value of the histogram falls below the threshold value calculated by the second histogram calculating device would be adopted as the prescribed target value of brightness of the target image, and the subject image data would be subjected to the gamma correction based upon the revised correction curve for which the brightness of the target image takes on the prescribed target value.

Thus, both the target image and subject image come to possess a comparatively appropriate brightness.

By way of example, the noise reduction parameter deciding device includes a differentiating circuit for calculating differential data by differentiating the revised correction curve; and a multiplying circuit for calculating the noise reduction parameter by multiplying the differential data, which has been calculated by the differentiating circuit, by data indicating amount of noise possessed by the subject image data prevailing immediately prior to the gamma correction.

By way of example, the brightness correcting device would be a gamma correction circuit for subjecting the subject image data to a gamma correction based upon a revised gamma correction curve according to which the brightness of the target image takes on the prescribed target value, and the noise reduction parameter deciding device would decide the noise reduction parameter based upon a slope angle of a gamma correction curve decided from a predetermined reference brightness and brightness of the gamma correction value vs. this reference brightness.

By way of example, the brightness correcting device would be a gamma correction circuit for subjecting the subject image data to a gamma correction based upon a revised correction curve according to which the brightness of the target image will take on the prescribed target value, and the noise reduction parameter deciding device would decide the noise reduction parameter based upon a level difference between a level that results after a predetermined reference brightness has been subjected to a gamma correction using a reference gamma curve and a level that results after the reference brightness has been subjected to a gamma correction using the revised gamma correction curve.

The apparatus may further comprise a contour extracting device (means) for extracting contour component data from the subject image data that has been subjected to the brightness correction by the brightness correcting device. In this case, the noise reducing device would apply noise reduction processing to the contour component data extracted by the contour extracting device. The apparatus may further comprise an adding circuit for adding the contour component data that has been subjected to noise reduction by the noise reducing device and the subject image data that has been subjected to the brightness correction by the brightness correcting device.

In a case where the subject image data is three-color subject image data, the brightness correcting device is a white-balance adjusting circuit, which includes three gain-up circuits corresponding to the subject image data of respective ones of the three colors, for raising the level of the three-color subject image data in such a manner that the brightness of the subject image will take on the prescribed target value.

The apparatus may comprise a first histogram calculating device (means) for calculating a histogram of image data obtained in a case where the three-color target image data has been subjected to the white-balance adjustment using a reference amount of gain; a threshold value deciding device (means) for deciding a threshold value based upon the histogram calculated by the first histogram calculating device; a revised gain-amount calculating device (means) for calculating a revised gain amount based upon an ideal value of brightness of the target image; a second histogram calculating device (means) for calculating a histogram of image data obtained in a case where the target image data has been subjected to the white-balance adjustment by the revised gain amount; and a loop control device (means) for executing processing that lowers the level of the ideal value until a peak value of the histogram calculated by the second histogram calculating device falls below the threshold value decided by the threshold value deciding device, and controlling the revised gain-amount calculating device and second histogram calculating device so as to repeat gain-amount calculation processing that is based upon the ideal value whose level has been lowered and white-balance adjustment processing that uses the revised gain amount. In this case, the ideal value at which the peak value of the histogram falls below the threshold value calculated by the second histogram calculating device would be adopted as the prescribed target value of brightness of the target image, and the subject image data would be subjected to the white-balance adjustment based upon the revised gain amount according to which the brightness of the target image takes on the prescribed target value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 illustrates the relationship between amounts of noise and filter coefficients according to the first embodiment;

FIG. 16A illustrates the relationship between slope angles and filter sizes, and FIG. 16B illustrates the relationship between slope angles and filter coefficients according to the second embodiment;

FIG. 18A illustrates the relationship between slope angles and filter sizes according to the modification, and FIG. 18B illustrates the relationship between slope angles and filter coefficients according to the modification;

FIG. 20 illustrates the relationship between slope angles and threshold values according to the third embodiment;

FIG. 21 illustrates the relationship between amounts of differentiation and threshold values according to the third embodiment;

DESCRIPTION OF THE PREFERRED EMBODIMENTS

Preferred embodiments of the present invention will now be described in detail with reference to the drawings.

Figure 1:
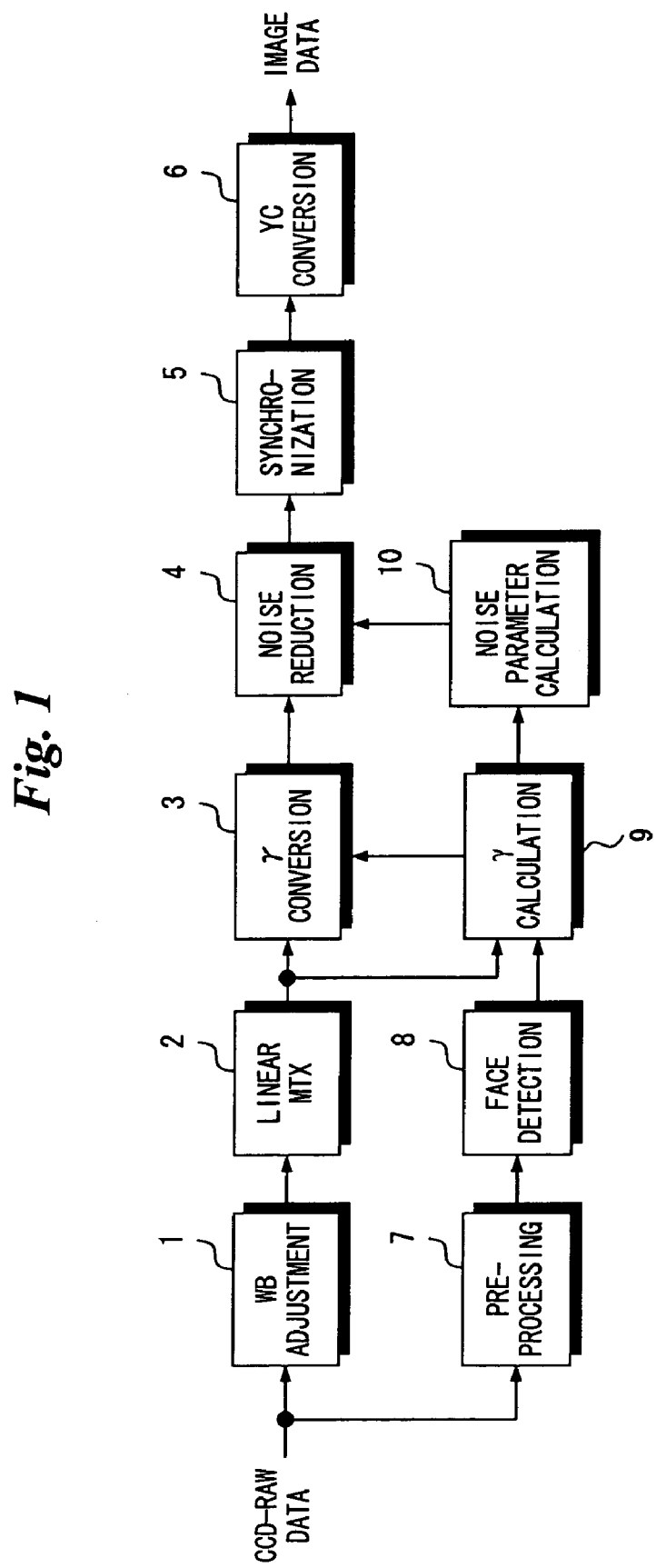
FIG. 1 is a block diagram illustrating part of the electrical structure of an image processing apparatus according to a first embodiment of the present invention.

FIG. 1, which illustrates an embodiment of the invention, is a block diagram illustrating part of the electrical structure of an image processing apparatus such as digital still camera.

The image processing apparatus according to this embodiment detects a face image (a target image) from within the image of a subject and arranges it so that both the detected face image and the overall image of the subject will have a comparatively appropriate brightness.

CCD-RAW data (parallel CCD-RAW data of the three primary colors comprising R, G, B) representing the image of a subject is obtained as by sensing the image of the subject. The CCD-RAW data is input to a white-balance adjusting circuit 1 and a preprocessing circuit 7.

The CCD-RAW data is subjected to a white-balance adjustment in the white-balance adjusting circuit 1. The CCD-RAW data that has undergone the white-balance adjustment in the white-balance adjusting circuit 1 is subjected to a prescribed simple color correction in a linear matrix circuit 2. The CCD-RAW data that has been output from the linear matrix circuit 2 is input to a gamma converting circuit 3 and a gamma calculating circuit 9. As will be described later in detail, if the image of the subject contains a face image, then a gamma correction is carried out in the gamma converting circuit 3 so as to obtain comparatively appropriate brightness for both the overall image of the subject and the face image. The gamma correction curve for achieving such appropriate brightness is calculated in the gamma calculating circuit 9. Data indicating the calculated gamma correction curve is applied to the gamma converting circuit 3 from the gamma calculating circuit 9.

The CCD-RAW data that has been subjected to the gamma correction in the gamma converting circuit 3 is input to a noise reducing circuit 4. A noise parameter that has been calculated in a noise parameter calculating circuit 10 also is applied to the noise reducing circuit 4. The latter executes noise reduction processing that conforms to a gamma correction curve (a basic gamma correction curve or a revised gamma correction curve) that is set in the gamma converting circuit 3.

The CCD-RAW data that has been subjected to noise reduction processing in the noise reducing circuit 4 undergoes synchronization processing in a synchronizing circuit 5 and is then input to a YC converting circuit 6. The latter generates luminance data Y and color difference data C (image data).

When the CCD-RAW data is input to the preprocessing circuit 7, the latter executes prescribed preprocessing such as G-signal extraction processing for detecting a face image from within the image of a subject, gain-up processing and gamma correction processing based upon the basic gamma correction curve. The image data (G signal) representing the subject image output from the preprocessing circuit 7 is input to a face detecting circuit 8, which executes face detection processing. A face image is detected from within the subject image by the face detecting circuit 8. Data representing the detected face image and data representing the position of the face image in the subject image is input to the gamma calculating circuit 9.

The gamma calculating circuit 9 generates the revised gamma correction curve as mentioned above using the CCD-RAW data representing the overall image of the subject, the image data representing the face image and the data representing the position of the face image. Data representing the revised gamma correction curve is also input to the noise parameter calculating circuit 10. The latter calculates a noise parameter.

Figure 2:
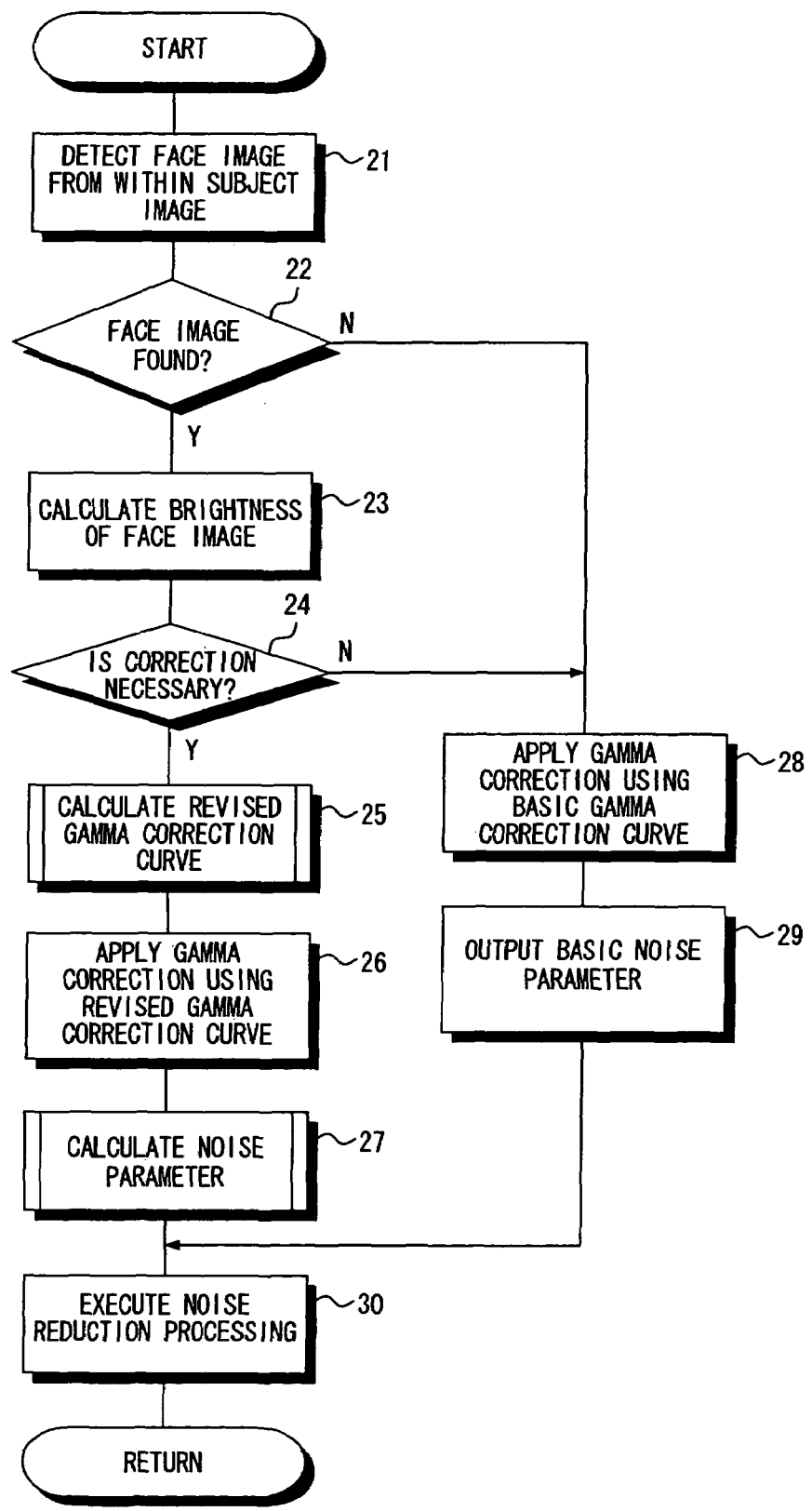
FIG. 2 is a flowchart illustrating processing executed by the image processing apparatus according to the first embodiment.

FIG. 2 is a flowchart illustrating processing executed by the image processing apparatus.

First, a face image is detected from within the image of the subject (step 21). If a face image is found ("YES" at step 22), then the brightness of the face image is calculated (step 23). Whether a correction is necessary or not is determined based upon the calculated brightness of the face image (step 24). It is determined that a correction is unnecessary if the calculated brightness of the face image is equal to or greater than a prescribed level, and that a correction is necessary if the calculated brightness of the face image is less than the prescribed level.

If it is determined that a correction is necessary ("YES" at step 24), then the revised gamma correction curve conforming to subject image brightness, etc., is generated (calculated) (step 25). The details of the method of generating the revised gamma correction curve will be described later. The image data representing the overall image of the subject is subjected to a gamma correction using the revised gamma correction curve generated (step 26). A noise parameter is calculated (step 27). The noise parameter is for suppressing an increase in noise produced in a case where a gamma correction based upon the revised gamma correction curve has been applied. The details of processing for calculating the noise parameter will be described later.

If it is determined that a correction is unnecessary ("NO" at step 24), or if a face image is not found ("NO" at step 22), then it is construed that a gamma correction that takes the brightness of the face image into consideration is not required. The image data representing the overall image of the subject, therefore, is subjected to a gamma correction using the prescribed basic gamma correction curve (step 28). Further, a basic noise parameter is output (step 29). The basic noise parameter is for suppressing an increase in noise produced in a case where a gamma correction based upon the basic gamma correction curve has been applied.

Noise reduction processing is applied to the gamma-corrected image data using the noise parameter obtained (step 30).

Figure 3:
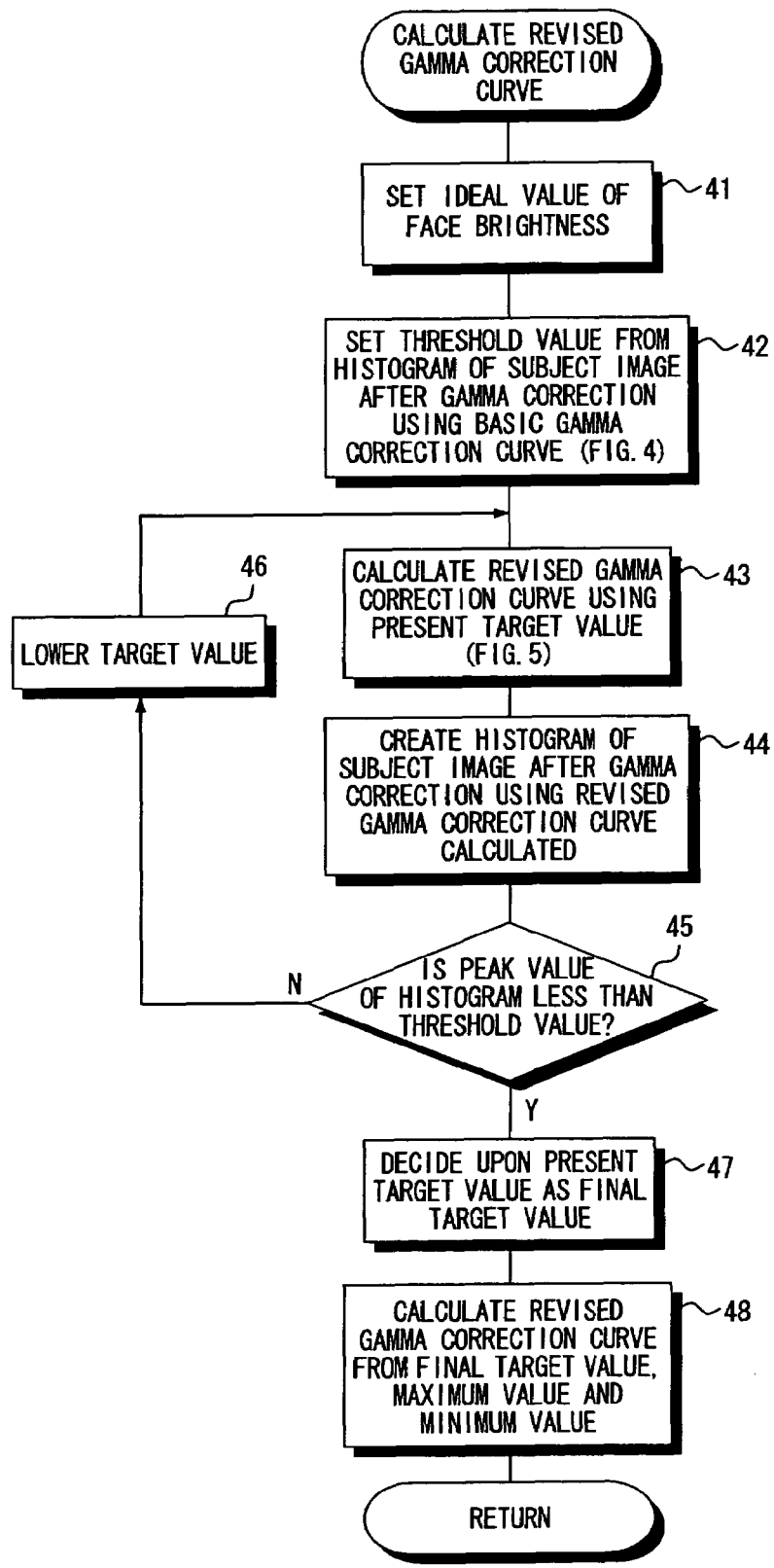
FIG. 3 is a flowchart illustrating processing for calculating a revised gamma correction curve according to the first embodiment.

FIG. 3 is a flowchart illustrating processing for calculating the revised gamma correction curve (the processing of step 25 in FIG. 2).

First, an ideal value of brightness that the face image should have is set (step 41). Next, the image data representing the overall image of the subject is subjected to a gamma correction using the basic gamma correction curve. A histogram is generated with regard to the image data gamma-corrected using the basic gamma correction curve, and a threshold value is set based upon the histogram generated (step 42).

Figure 4:
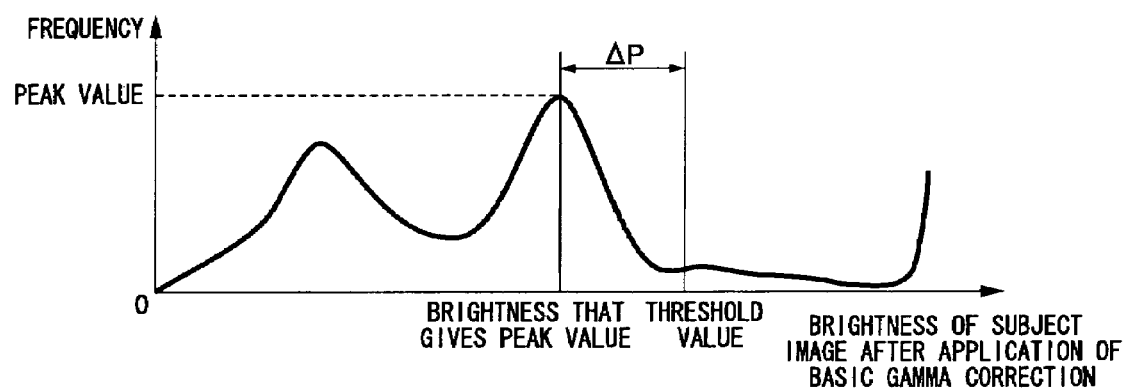
FIG. 4 is a brightness histogram of the image of a subject after application of a basic gamma correction according to the first embodiment.

FIG. 4 is an example of image data that has been subjected to the gamma correction using the basic gamma correction curve. The brightness of the image of the subject is plotted along the horizontal axis and the frequency of this brightness is plotted along the vertical axis.

First, the peak value of brightness frequency is found. A value of brightness greater by a prescribed level ΔP than the brightness that gives the found peak value is decided upon as a threshold value. The threshold value is decided relatively taking the peak value into consideration.

With reference again to FIG. 3, the revised gamma correction curve is calculated using the present target value (step 43). The target value is a value of brightness of the face image after application of the gamma correction using the revised gamma correction curve. Initially, this is the ideal value that was set at step 41.

Figure 5:
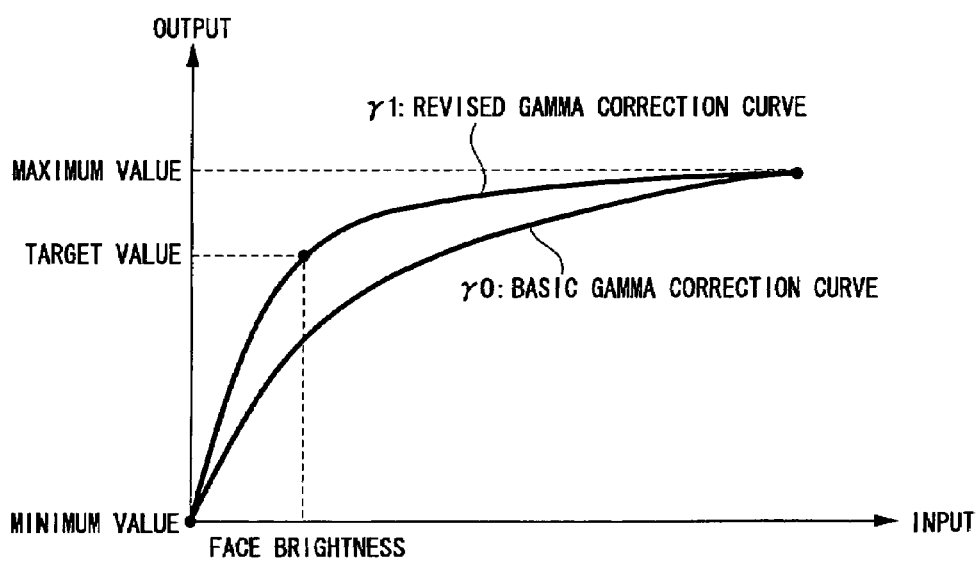
FIG. 5 illustrates a basic gamma correction curve and a revised gamma correction curve according to the first embodiment.

FIG. 5 illustrates an example of the revised gamma correction curve and basic gamma correction curve. Inputs and outputs are plotted along the horizontal and vertical axes, respectively.

A basic gamma correction curve γ0 is predetermined. A revised gamma correction curve γ1 is decided in such a manner that the brightness of the face image after application of the gamma correction using the revised gamma correction curve γ1 will become the target value. Furthermore, the minimum and maximum values of the inputs and outputs of the gamma correction are the same values on both the basic gamma correction curve γ0 and revised gamma correction curve γ1. The revised gamma correction curve γ1 is generated (calculated) from the minimum value, target value and maximum value utilizing spline interpolation.

With reference again to FIG. 3, when the revised gamma correction curve is generated, the image data representing the overall image of the subject is subjected to a gamma correction using the revised gamma correction curve generated. A histogram of the image data to which the gamma correction has been applied is created again (step 44). Whether the brightness that gives the peak value of frequency of the histogram that has been created again is less than the set threshold value is checked (step 45). If the brightness that gives the peak value of frequency exceeds the threshold value ("NO" at step 45), it is construed that the overall image of the subject has become too bright owing to application of the gamma correction using the revised gamma correction curve. The target value of the face image is therefore lowered the prescribed level (step 46). The generation of the revised gamma correction curve (step 43), the creation of the histogram (step 44) and the comparison of peak value and threshold value (step 45) are performed again using the target value that has been lowered the prescribed level. The processing of steps 43, 44 and 45 is repeated until the peak value falls below the threshold value.

If the brightness that gives the peak value of the frequency of the histogram falls below the threshold value ("YES" at step 45), the presently set target value is set as the final target value (step 47). The revised gamma correction curve is generated using the target value thus set as well as the maximum and minimum values of the inputs and outputs of the gamma correction (step 48).

Figure 6:
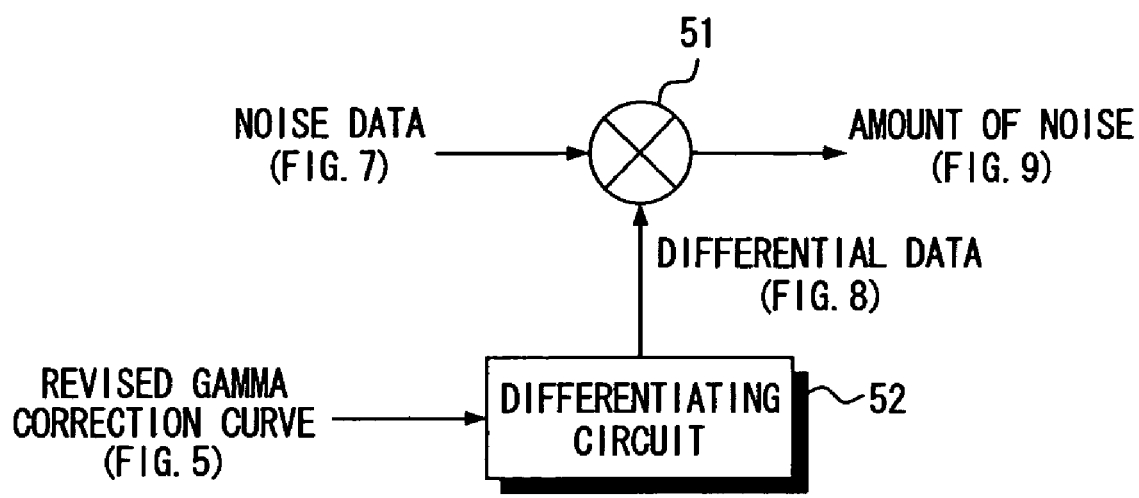
FIG. 6 is a block diagram illustrating the electrical structure of a noise parameter calculation circuit according to the first embodiment.

FIG. 6 is a block diagram illustrating the electrical structure of the noise parameter calculating circuit 10.

Figure 7:
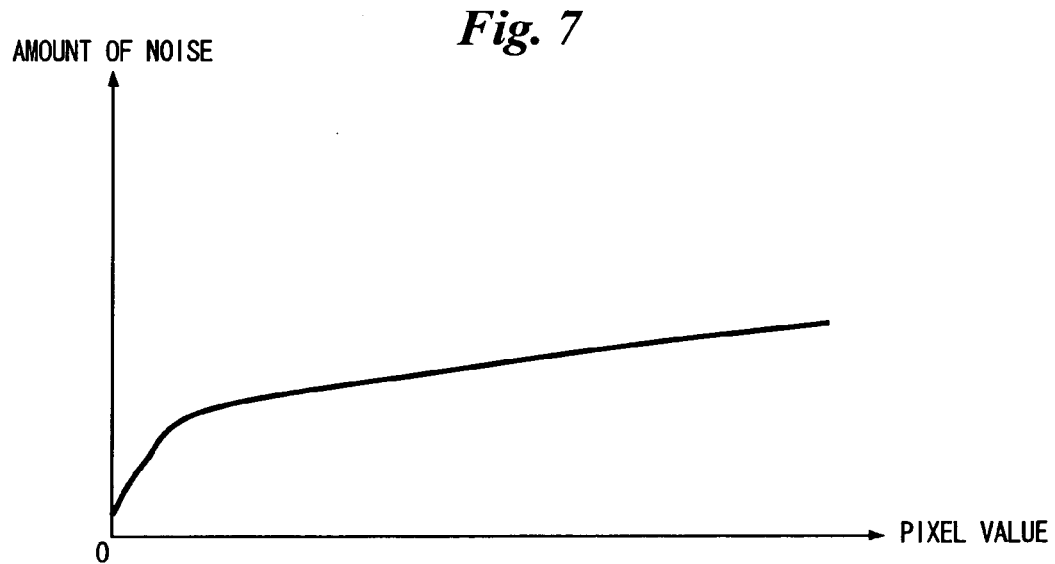
FIG. 7 illustrates amount of noise in image data representing the image of a subject according to the first embodiment.

The noise parameter calculating circuit 10 includes a memory. Stored in the memory is noise data indicating the relationship between the level (pixel value) of image data that corresponds to the image data representing the entire subject image that has been output from the linear matrix circuit 2, and the amount of noise in this image data, as illustrated in FIG. 7. The noise data increases in amount as the level of the image data increases. The noise data is obtained beforehand by sensing the image of a prescribed subject.

With reference again to FIG. 6, the noise data that has been stored in the memory is applied to a multiplying circuit 51.

Figure 8:
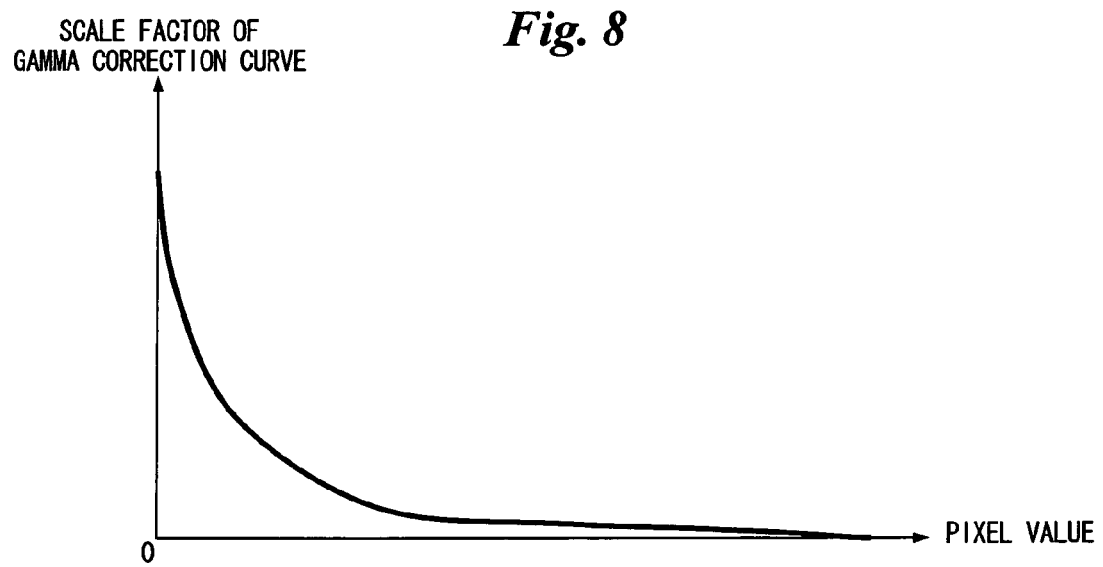
FIG. 8 illustrates noise data according to the first embodiment.

Further, the data indicating the revised gamma correction curve calculated in the gamma calculating circuit 9 is input to a differentiating circuit 52 within the noise parameter calculating circuit 10. The differentiating circuit 52 differentiates the data indicating the revised gamma correction curve (see FIG. 5), whereby differential data (scale factor of the revised gamma correction curve) shown in FIG. 8 is obtained.

With reference again to FIG. 6, the differential data also is applied to the multiplying circuit 51.

Figure 9:
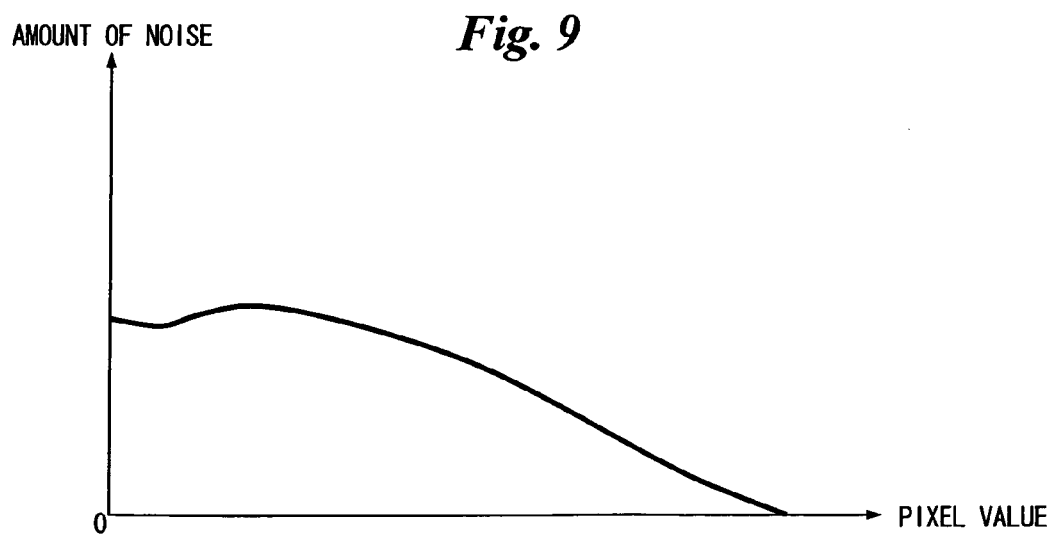
FIG. 9 illustrates amount of noise in image data that has undergone a gamma correction by a revised gamma correction curve according to the first embodiment.

The multiplying circuit 51 multiplies the noise data (see FIG. 7) by the differential data (see FIG. 8), whereby an amount of noise shown in FIG. 9 is obtained. The noise parameter is calculated based upon the amount of noise obtained, as will be described later. The calculated noise parameter is applied to the noise reducing circuit 4, as described above.

Illustrated in FIG. 9 is the level of pixels constituting the image of the subject versus the amount of noise at the pixel level. This takes into consideration an increase in amount of noise produced in a case where the gamma correction is performed using the revised gamma correction curve γ1, as described above. Accordingly, noise reduction processing is executed in consideration of the amount of noise, thereby making it possible to suppress the amount of noise produced by executing a gamma correction using the revised gamma correction curve γ1.

Figure 10:
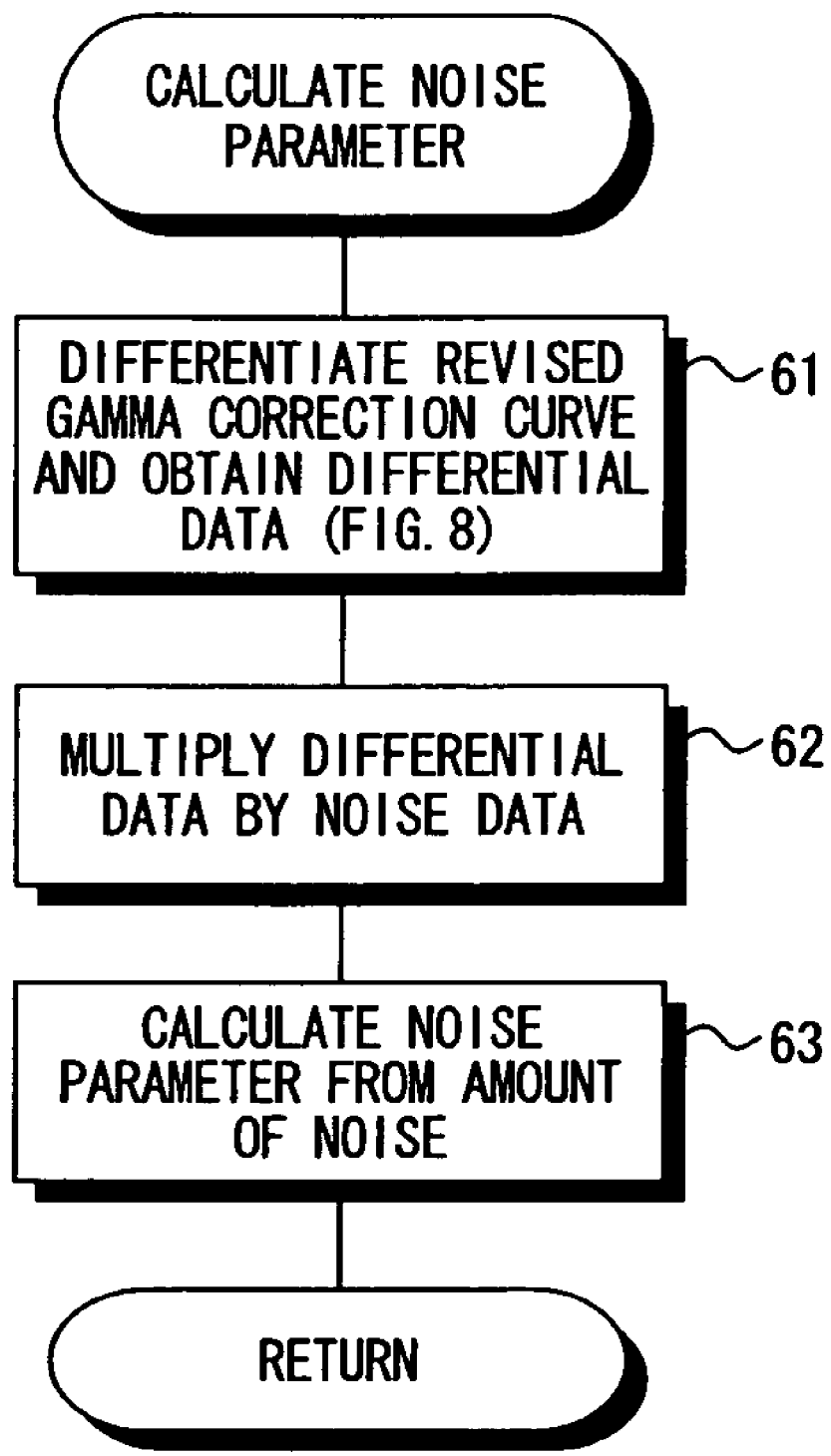
FIG. 10 is a flowchart illustrating processing for calculating a noise parameter according to the first embodiment.

FIG. 10 is a flowchart illustrating processing for calculating the noise parameter.

Differential data is obtained by differentiating the revised gamma correction curve obtained in the manner described above (step 61). The amount of noise is obtained, as described above, by multiplying the obtained differential data by noise data that has been stored in advance (step 62). The noise parameter is calculated based on the obtained amount of noise, as described below (step 63).

FIG. 11 illustrates the relationship between amounts of noise and filter coefficients (noise parameters) of filter circuits that construct the noise reducing circuit 4.

Noise reduction processing in the noise reducing circuit 4 is executed using n×n filter circuits. A mask area of 5×5 pixels that is centered on a pixel of interest serving as the target of noise reduction processing is set in the subject image represented by the subject image data that has been output from the gamma converting circuit 3, and the average luminance (brightness) of the set mask area is calculated. The amount of noise in the calculated average luminance is calculated from the graph illustrated in FIG. 9. Filter coefficients corresponding to the calculated amount of noise are obtained from the relationship illustrated in FIG. 11 and the obtained filter coefficients are set in the filter circuits of the noise reducing circuit 4 as noise parameters. Noise reduction processing is executed by executing filtering processing using the set filter coefficients.

The calculation of amount of noise, setting of filter coefficients and filtering processing based upon the set filter coefficients are performed with regard to the entirety of one frame of the image of the subject.

The example set forth above is that of a case where a gamma correction has been performed using the revised gamma correction curve. However, it can be understood that noise parameters are calculated in a similar manner also in a case where a gamma correction has been performed using the basic gamma correction curve.

Figure 12:
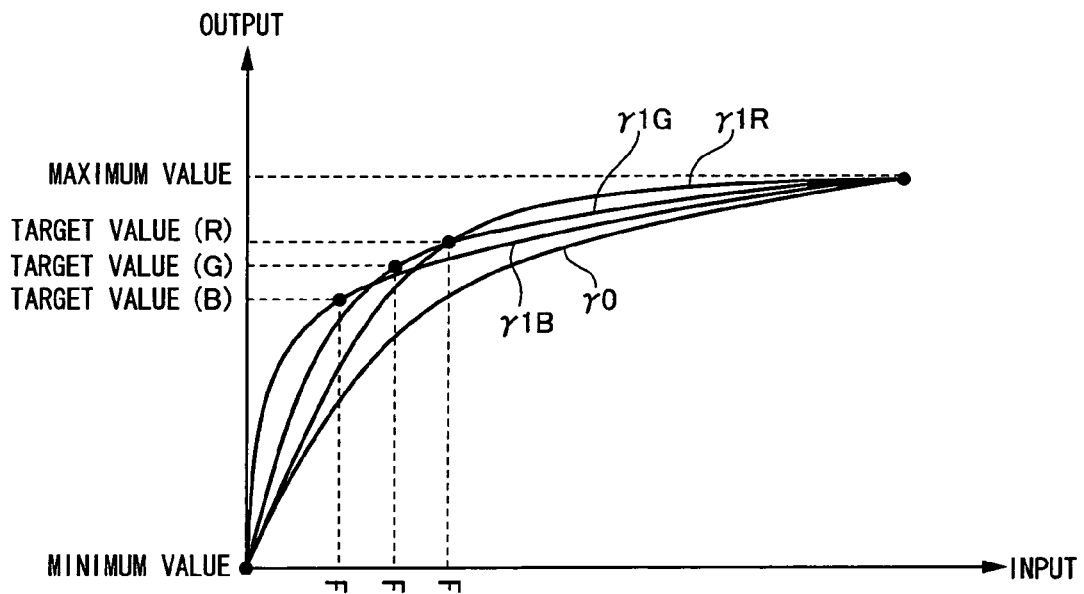
FIG. 12 illustrates a basic gamma correction curve and revised gamma correction curves according to the first embodiment.

FIG. 12 illustrates an example of values of basic and revised gamma correction curves. This corresponds to FIG. 5.

According to the gamma correction curves illustrated in FIG. 5, there is one basic gamma correction curve and one revised gamma correction curve. According to the gamma correction curves illustrated in FIG. 12, however, one gamma correction curve and three revised gamma correction curves are illustrated. The three revised gamma correction curves are a revised gamma correction curve γ1R for an R (red) component, a revised gamma correction curve γ1G for a G (green) component and a revised gamma correction curve γ1B for a B (blue) component.

The items of R-component image data, G-component image data and B-component image data that enter the gamma converting circuit 3 are subjected to a gamma correction using the R-component revised gamma correction curve γ1R, G-component revised gamma correction curve γ1G and B-component revised gamma correction curve γ1B, respectively. Since a gamma correction is carried out using the revised gamma correction curves corresponding to each of the colors, both the face image and the entire image of the subject are made attractive images.

Figure 13:
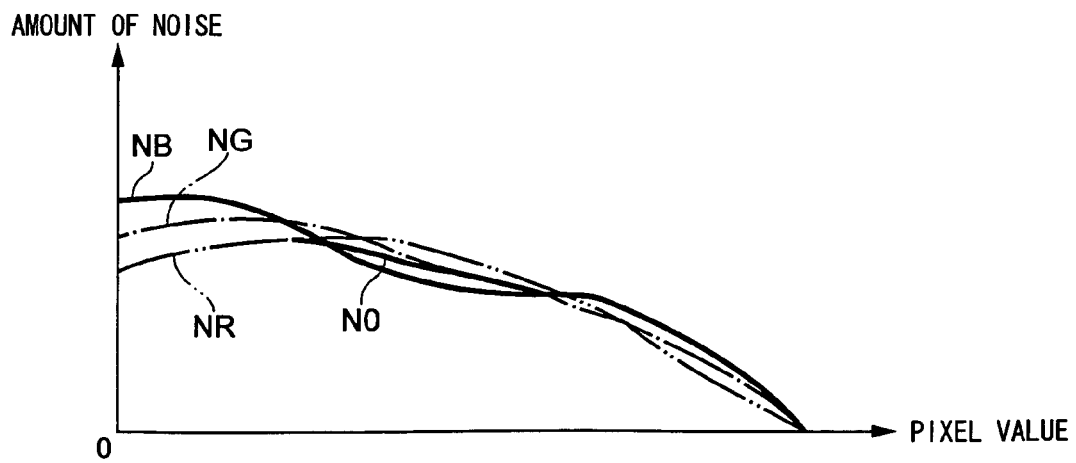
FIG. 13 illustrates amount of noise in image data that has undergone a gamma correction by a revised gamma correction curve according to the first embodiment.

FIG. 13 shows graphs for calculating amount of noise. This corresponds to FIG. 9.

In these graphs also a graph NR for calculating R-component amount of noise, a graph NG for calculating G-component amount of noise and a graph NB for calculating B-component amount of noise are defined in a manner similar to that of FIG. 12. Further, a graph N0 for calculating amount of noise in a case where the basic gamma correction curve γ0 has been used also is illustrated. An amount of noise is decided for every color and noise reduction processing for every color utilizing the decided amount of noise is executed. It goes without saying that in a case where noise reduction processing for every color is executed, a filter circuit corresponding to each color is provided in the noise reducing circuit.

FIGS. 14 to 18B illustrate a second embodiment of the invention.

Figure 14:
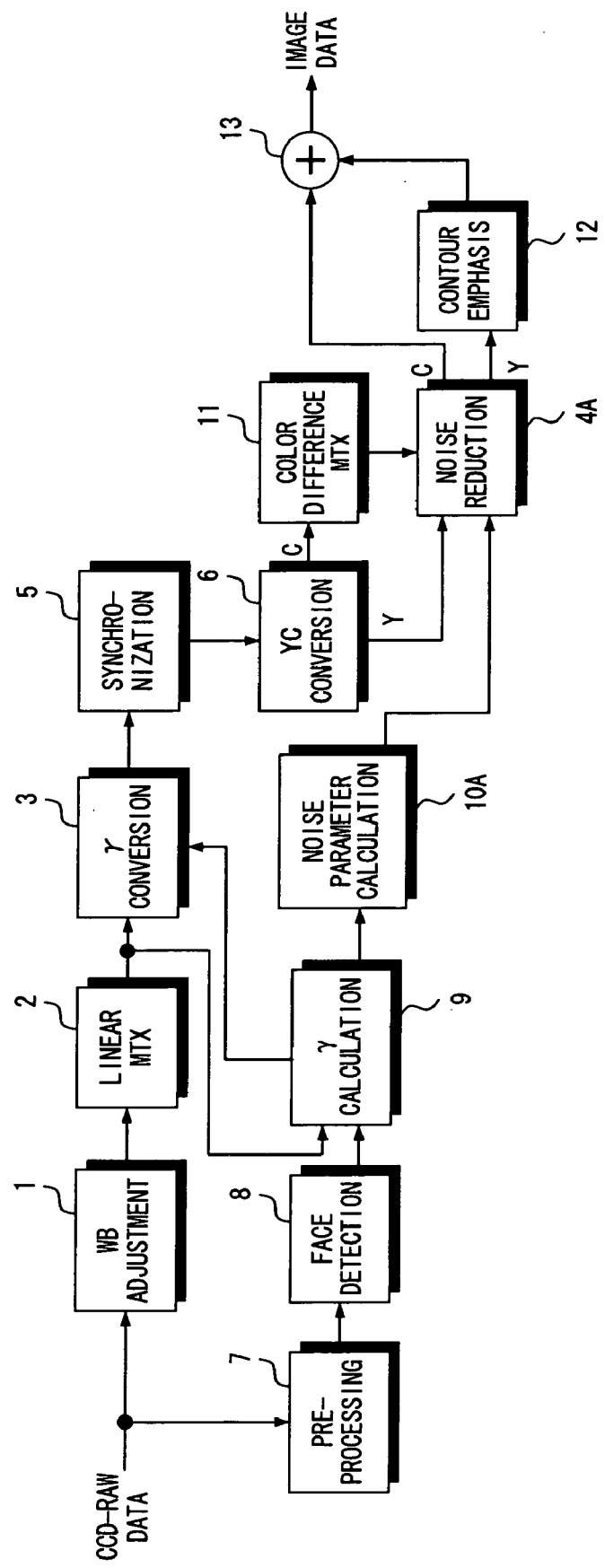
FIG. 14 is a block diagram illustrating part of the electrical structure of an image processing apparatus according to a second embodiment.

FIG. 14 is a block diagram illustrating part of the electrical structure of an image processing apparatus. Components in FIG. 14 identical with those shown in FIG. 1 are designated by like reference characters and need not be described again.

Data representing the revised gamma correction curve that has been calculated in the gamma calculating circuit 9 is input to a noise parameter calculating circuit 10A. The latter calculates noise parameters, as will be described later, and applies the parameters to a noise reducing circuit 4A.

Luminance data Y that has been calculated in the YC converting circuit 6 is input directly to a noise reducing circuit 4A, and color difference data C is subjected to a color correction in a color difference matrix circuit 11 and is then input to the noise reducing circuit 4A. The color difference data that has been subjected to noise reduction processing in the noise reducing circuit 4A is applied directly to an adding circuit 13. The luminance data Y is subjected to contour emphasizing processing in a contour emphasizing circuit 12 and is then applied to the adding circuit 13. The latter adds the luminance data and the color difference data and outputs the result.

Figure 15:
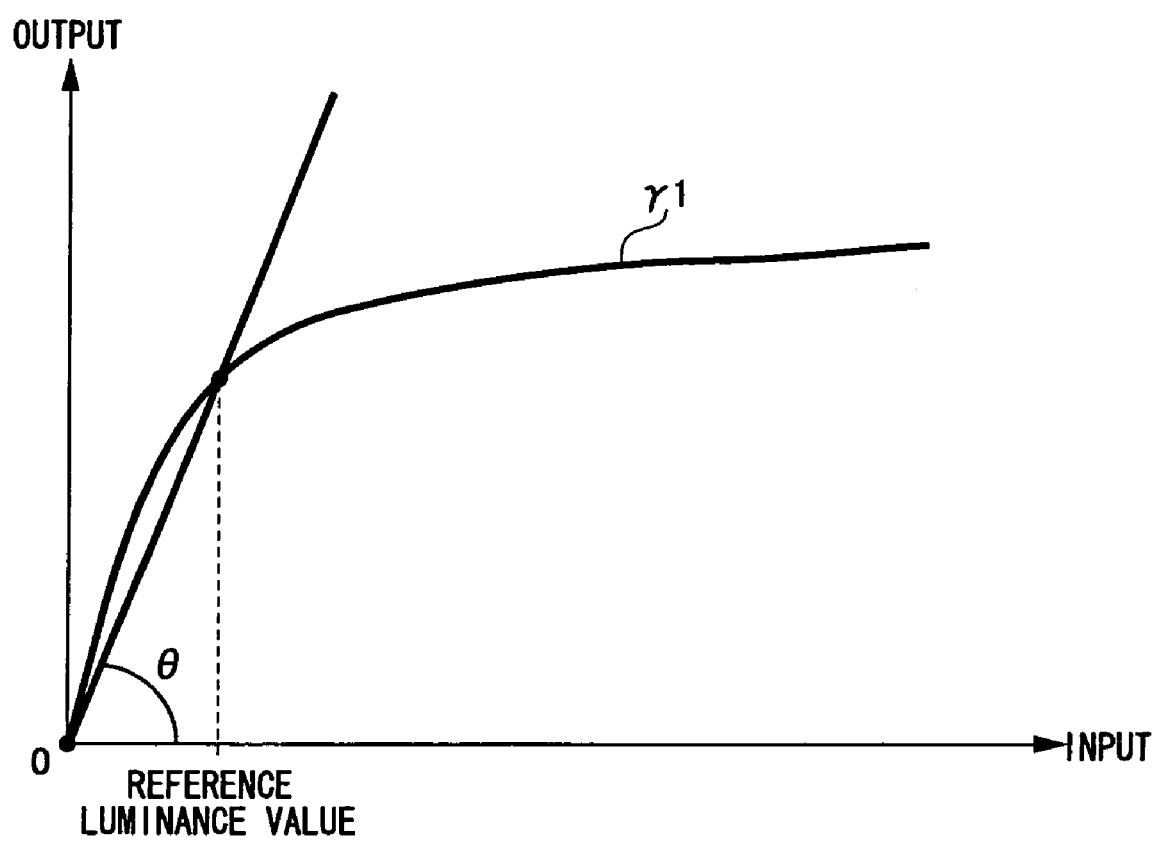
FIG. 15 illustrates an example of a revised gamma correction curve according to the second embodiment.

FIG. 15 illustrates an example of a revised gamma correction curve generated in the gamma calculating circuit 9.

In this embodiment, the slope angle θ of the revised gamma correction curve γ1 generated is utilized. The slope angle θ is an angle formed by a straight line connecting a prescribed reference luminance value (20% of the maximum luminance value, the luminance value of a face image, etc.) and the origin. Noise parameters are decided using the slope angle θ.

FIG. 16A illustrates the relationship between values of the slope angle θ and filter sizes (noise parameters), and FIG. 16B illustrates the relationship between values of the slope angle θ and filter coefficients (noise parameters).

As shown in FIG. 16A, if values of slope angle θ are 0 to 59°, 60 to 65°, 66 to 70°, 71 to 80° and 81 to 90°, then the filter sizes of the noise reducing circuit 4A will be $n_1$, $n_2$, $n_3$, $n_4$ and $n_5$, respectively (filter size is such that the larger the slope angle, the greater the amount of noise reduction performed by the filter). The filter size decided in accordance with the slope angle θ is applied to the noise reducing circuit 4A as a noise parameter. The noise reducing circuit 4A executes noise reduction processing by the filter circuit conforming to the applied filter size.

As shown in FIG. 16B, if values of slope angle θ are 0 to 59°, 60 to 65°, 66 to 70°, 71 to 80° and 81 to 90°, then the filter coefficients of the noise reducing circuit 4A will be $n_{111}$ to $n_{nn1}$, $n_{112}$ to $n_{nn2}$, $n_{113}$ to $n_{nn3}$, $n_{114}$ to $n_{nn4}$, and $n_{115}$ to $n_{nn5}$, respectively (filter coefficients are such that the larger the slope angle, the greater the amount of noise reduction performed). The filter coefficients decided in accordance with the slope angle θ are applied to the noise reducing circuit 4A as noise parameters.

Figure 17:
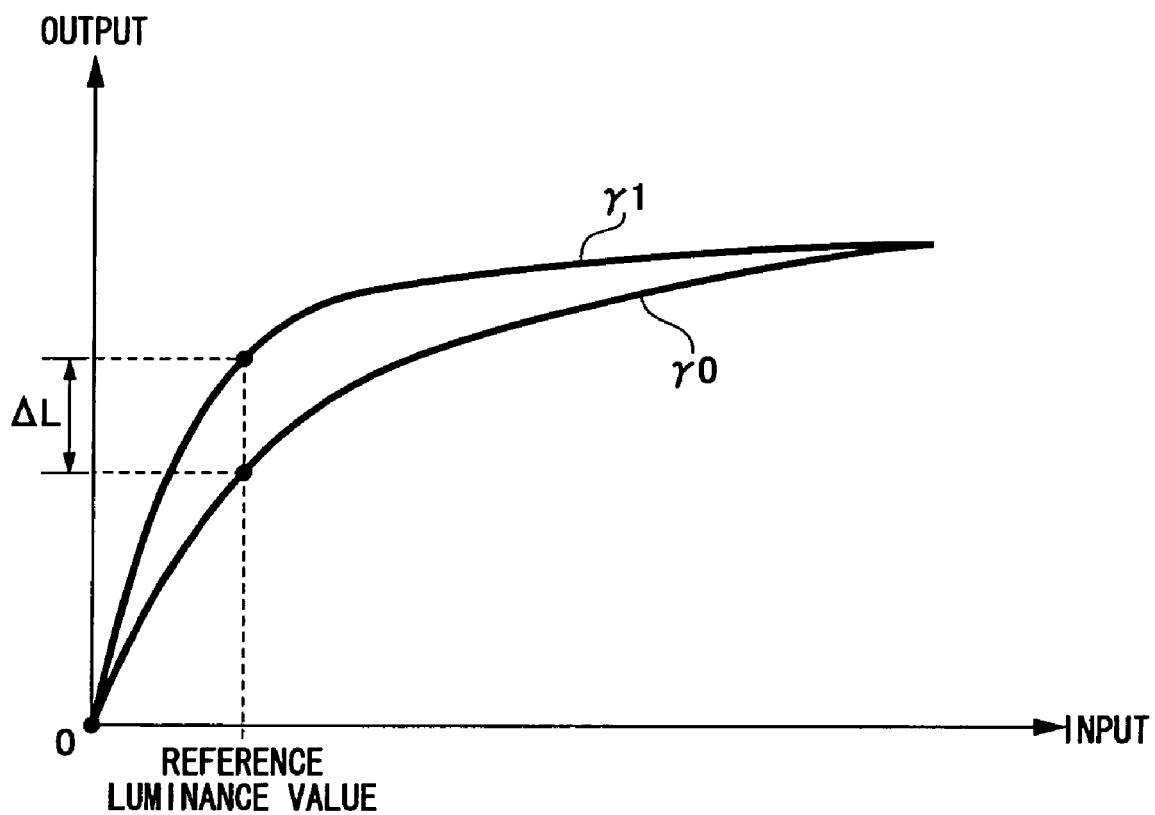
FIG. 17 illustrates the relationship between a basic gamma correction curve and a revised gamma correction curve according to a modification.

FIGS. 17, 18A and 18B illustrate a modification.

FIG. 17 illustrates the basic gamma correction curve γ0 and revised gamma correction curve γ1. A difference quantity ΔL is calculated between a value obtained by subjecting a reference luminance value to a gamma correction using the basic gamma correction curve γ0 and a value obtained by subjecting the reference luminance value to a gamma correction using the revised gamma correction curve γ1. Noise parameters are decided using the calculated difference quantity ΔL.

FIG. 18A illustrates the relationship between values of the difference quantity ΔL and filter sizes, and FIG. 18B illustrates the relationship between values of the difference quantity ΔL and filter coefficients.

As shown in FIG. 18A, if values of difference quantity ΔL are 0 to 5, 6 to 15, 16 to 30, 31 to 45 and 46 or greater, then the filter sizes of the noise reducing circuit 4A will be $n_1$, $n_2$, $n_3$, $n_4$ and $n_5$, respectively. The filter size decided in accordance with the difference quantity ΔL is applied to the noise reducing circuit 4A as a noise parameter.

As shown in FIG. 18B, if values of difference quantity ΔL are 0 to 5, 6 to 15, 16 to 30, 31 to 45 and 46 or greater, then the filter coefficients of the noise reducing circuit 4A will be $n_{111}$ to $n_{nn1}$, $n_{112}$ to $n_{nn2}$, $n_{113}$ to $n_{nn3}$, $n_{114}$ to $n_{nn4}$, and $n_{115}$ to $n_{nn5}$, respectively. The filter coefficients decided in accordance with the difference quantity ΔL are applied to the noise reducing circuit 4A as noise parameters.

Figure 19:
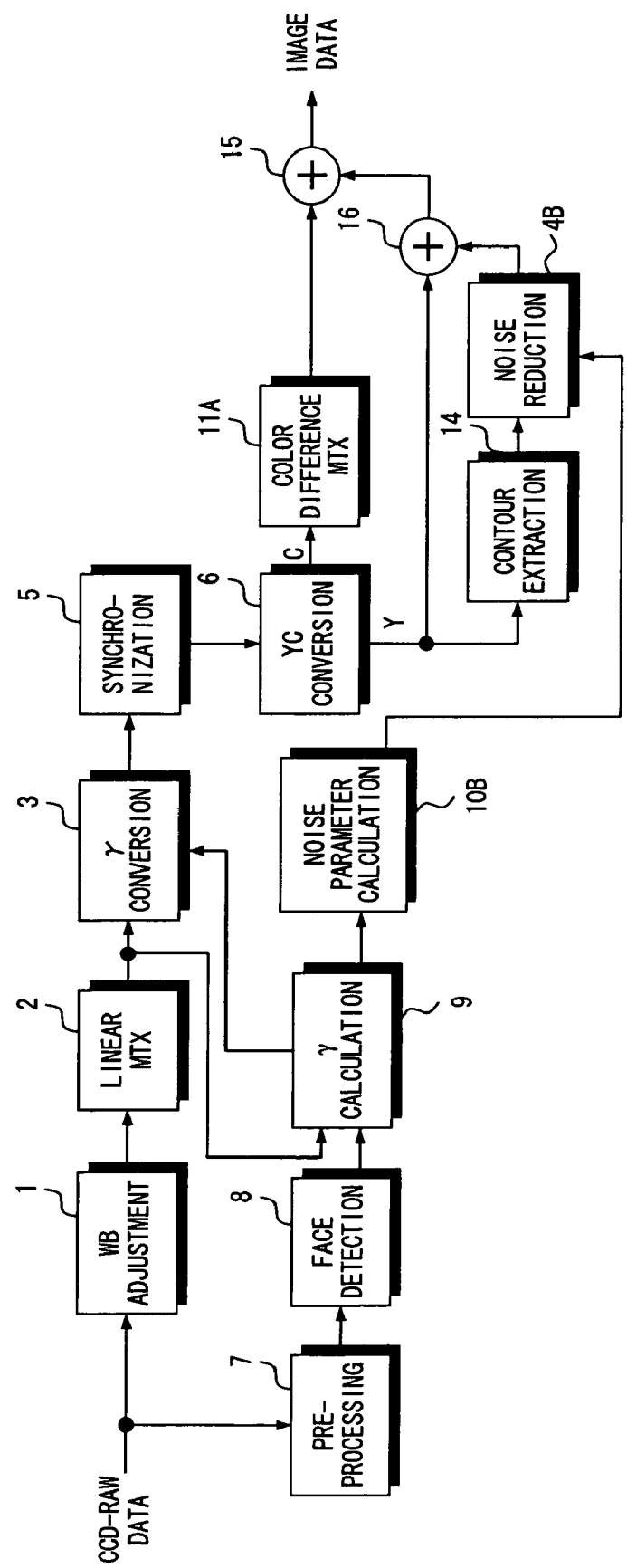
FIG. 19 is a block diagram illustrating part of the electrical structure of an image processing apparatus according to a third embodiment.

FIGS. 19 to 21 illustrate a third embodiment of the invention. This embodiment extracts contour components from luminance data and eliminates those components of the extracted contour components that are below a prescribed threshold value, thereby reducing noise.

FIG. 19 is a block diagram illustrating part of the electrical structure of an image processing apparatus. Components in FIG. 19 identical with those shown in FIG. 1 or FIG. 14 are designated by like reference characters and need not be described again.

A threshold value is decided in accordance with slope angle θ and difference quantity ΔL in the noise parameter calculating circuit 10B shown in FIG. 19. Data representing the threshold value decided is applied to a noise reducing circuit 4B as a noise parameter.

The luminance data Y that has been output from the YC converting circuit 6 is applied to a contour extracting circuit 14 and to an adding circuit 16. The contour extracting circuit 14 extracts contour data representing contour components of the image of a subject represented by luminance data. The extracted contour data is applied to the noise reducing circuit 4B.

The noise reducing circuit 4B eliminates contour data below a threshold value represented by the noise parameter supplied from the noise parameter calculating circuit 10B. By cutting contour delay that is below the threshold value, noise components are removed. The contour data from which the noise components have been eliminated in the noise reducing circuit 4B are applied to the adding circuit 16, which proceeds to add the contour data to the luminance data Y. Luminance data that has been output from the adding circuit 16 is applied to an adding circuit 15, whereby image data that is the sum of the luminance data Y and color difference data C is obtained.

FIG. 20 illustrates the relationship between the slope angle θ and threshold value.

If values of slope angle θ are 0 to 59°, 60 to 65°, 66 to 70°, 71 to 80° and 81 to 90°, then the threshold values are made th1, th2, th3, th4 and th5, respectively (where th1<th2<th3<th4<th5 holds). The threshold value is decided in accordance with the slope angle θ calculated. Data representing the decided threshold value is applied to the noise reducing circuit 4B, as mentioned above.

FIG. 21 illustrates the relationship between the difference quantity ΔL and threshold value.

If values of difference quantity ΔL are 0 to 5, 6 to 15, 16 to 30, 31 to 45 and 46 or greater, then the threshold values are made th1, th2, th3, th4 and th5, respectively (where th1<th2<th3<th4<th5 holds). The threshold value is decided in accordance with the difference quantity ΔL calculated. Data representing the decided threshold value is applied to the noise reducing circuit 4B, as mentioned above.

FIGS. 22 to 25 illustrate a fifth embodiment of the invention. In the embodiment described above, the brightness of a face image is increased owing to the gamma correction. In the embodiment described below, however, it is so arranged that brightness of a face image is increased by raising the gain in a white-balance adjusting circuit.

Figure 22:
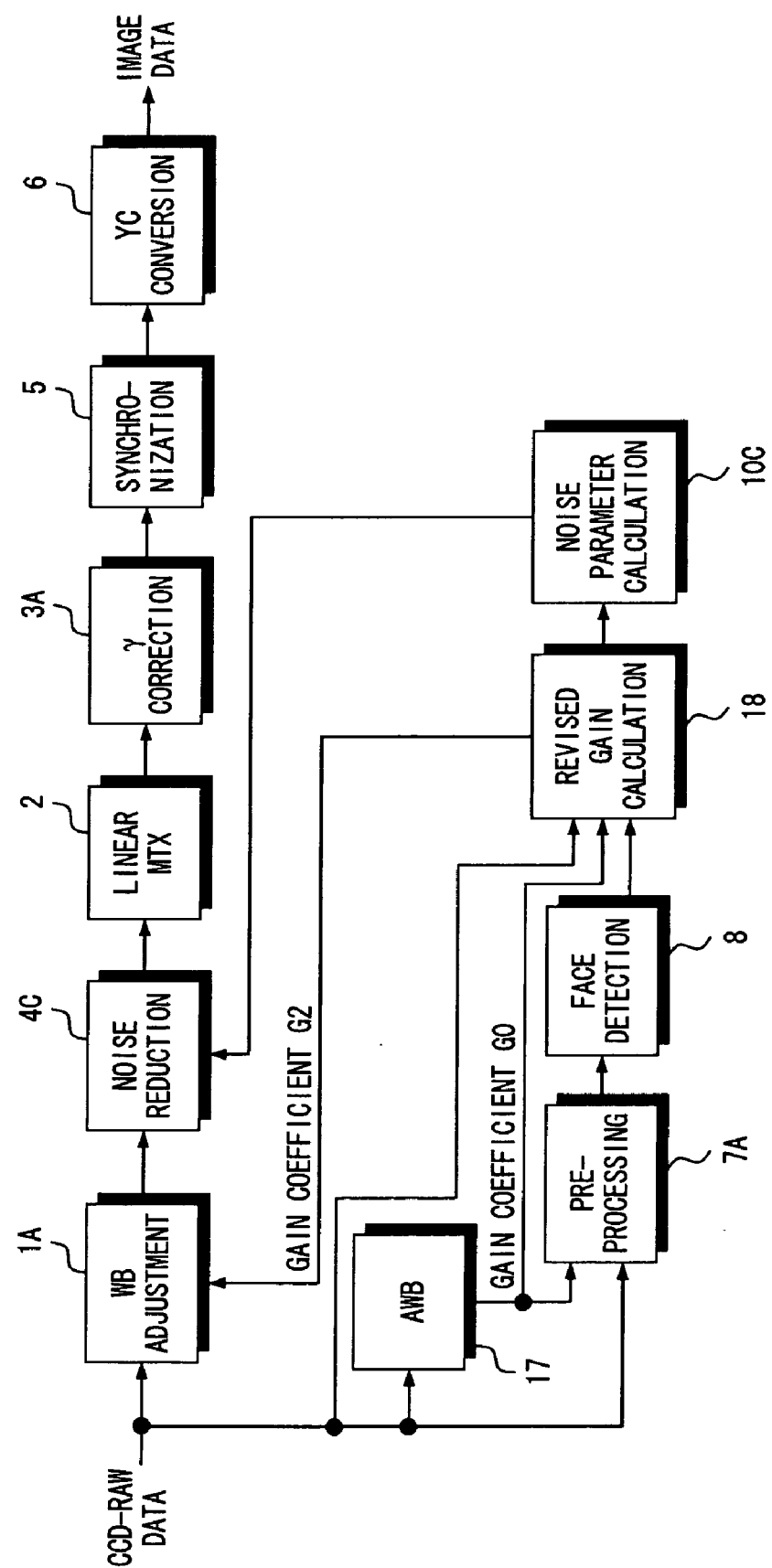
FIG. 22 is a block diagram illustrating part of the electrical structure of an image processing apparatus according to a fourth embodiment.

FIG. 22 is a block diagram illustrating part of the electrical structure of an image processing apparatus. Components in FIG. 22 identical with those shown in FIG. 1 are designated by like reference characters and need not be described again.

CCD-RAW data is input to a white-balance adjusting circuit 1A, a revised-gain calculating circuit 18, an automatic white-balance coefficient calculating circuit 17 and a preprocessing circuit 7A.

The automatic white-balance coefficient calculating circuit 17 calculates gain coefficients G0R, G0C and G0B in an ordinary white-balance adjustment. The gain coefficients G0R, G0C and G0B calculated are applied to the preprocessing circuit 7A and revised-gain calculating circuit 18. The preprocessing circuit 7A performs an ordinary white-balance adjustment based upon the gain coefficients G0R, G0C and G0B applied thereto. The image data that has undergone the white-balance adjustment is input to the face detecting circuit 8, which proceeds to execute face detection processing. Processing for detecting a face image in the image of the subject is executed in the face detecting circuit 8. Image data representing the face image and data representing the position of the face image is input to the revised-gain calculating circuit 18. The latter calculates the revised gain coefficients G2R, G2G and G2B. The revised gain coefficients G2R, G2G and G2B calculated are applied to the white-balance adjusting circuit 1A and noise parameter calculating circuit 10C. A method of calculating the revised gain coefficients G2R, G2G and G2B will be described below in detail.

The white-balance adjusting circuit 1A executes a white-balance adjustment (gain-up adjustment) in such a manner that the face image and the entirety of the image of the subject will both take on an appropriate brightness. The image data that has been output from the white-balance adjusting circuit 1A is subjected to noise reduction processing in a noise reducing circuit 4C in accordance with the noise parameter supplied from the noise parameter calculating circuit 10C.

Figure 23:
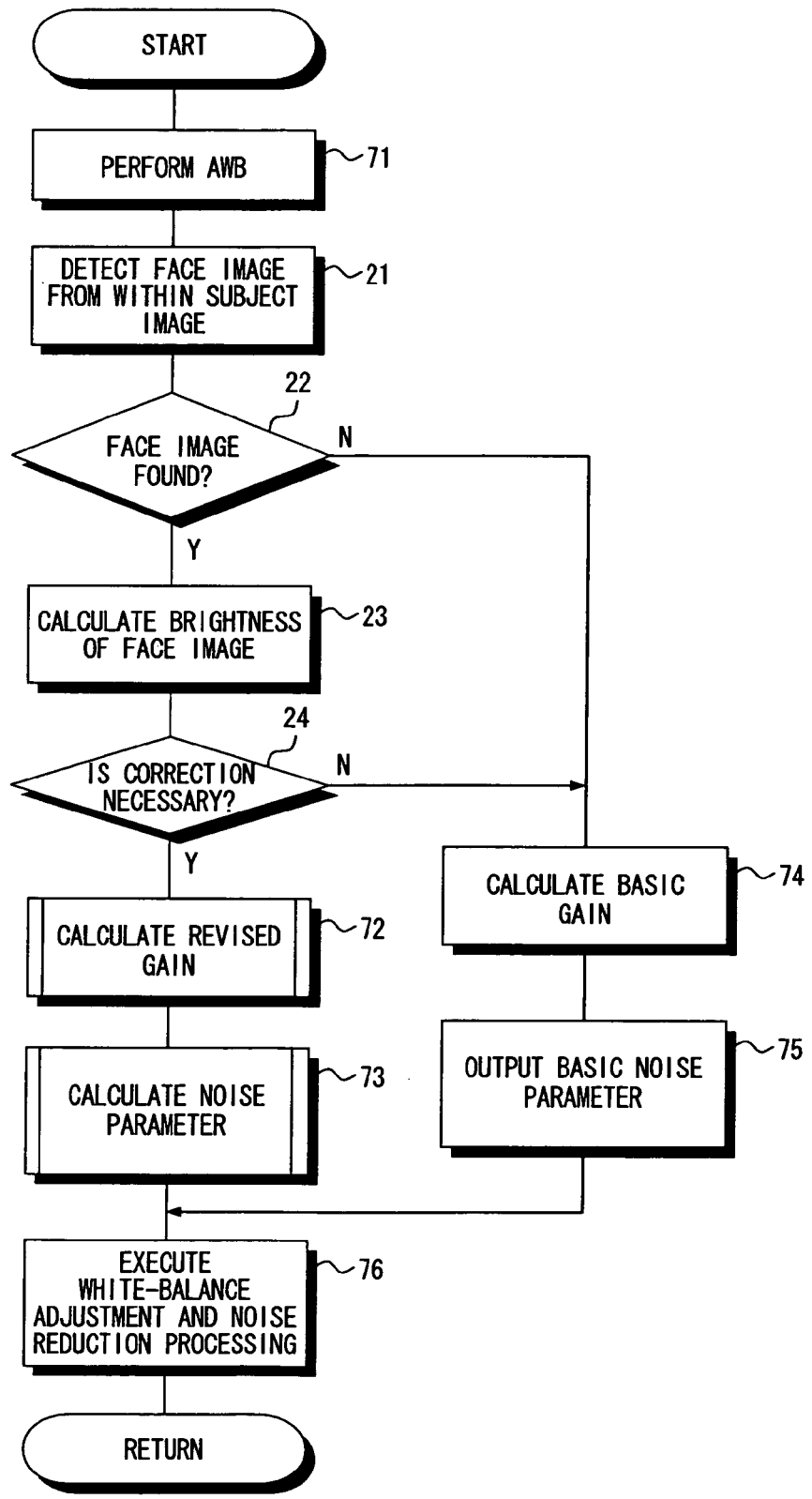
FIG. 23 is a flowchart illustrating processing executed by the image processing apparatus according to the fourth embodiment.

FIG. 23 is a flowchart illustrating processing executed by the image processing apparatus shown in FIG. 22. Processing in FIG. 23 identical with that shown in FIG. 22 is designated by like processing steps and need not be described again.

Automatic white-balance coefficients are calculated and automatic white-balance adjustment processing is executed using the white-balance coefficients calculated (step 71). Thereafter, if a face image is found and it is determined that the face image found requires correction ("YES" at step 24), then revised gain is calculated (step 72). This is followed by calculation of a revised noise parameter (step 73). If it is determined that a correction is unnecessary ("NO" at step 22 or 24), then basic gain is output (step 74). Further, a basic noise parameter is output (step 75).

White balance is adjusted using the revised gain or basic gain obtained and noise reduction processing is executed using the noise parameter obtained (step 76).

Figure 24:
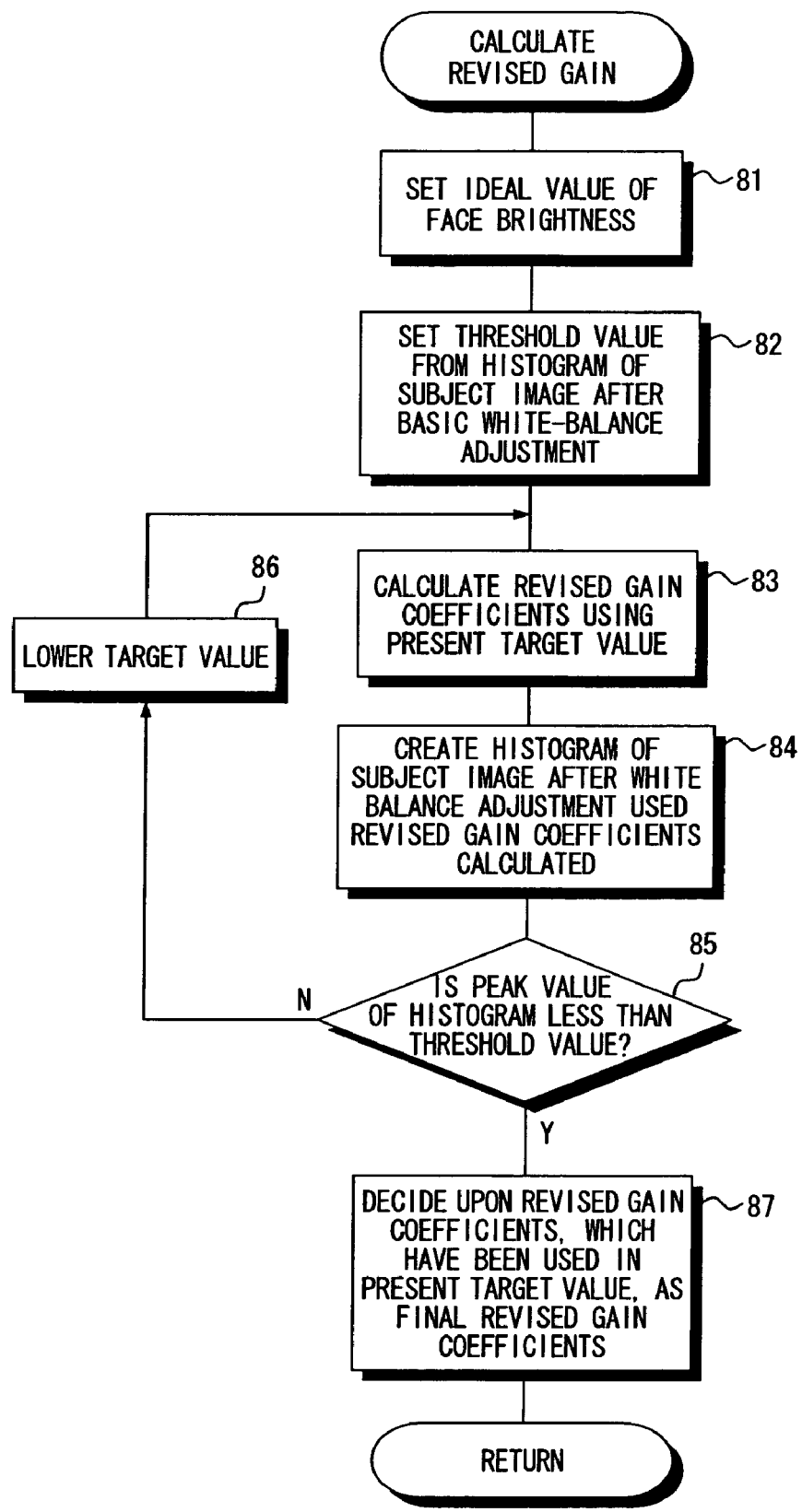
FIG. 24 is a flowchart illustrating processing for calculating a revised gamma correction curve according to the fourth embodiment.

FIG. 24 is a flowchart illustrating processing for calculating revised gain (the processing of step 72 in FIG. 23).

First, the ideal value of brightness of the detected face image is set (step 81). The basic white-balance adjustment is performed using the gain coefficients calculated in the automatic white-balance coefficient calculating circuit 17. A histogram of the CCD-RAW data that has undergone the basic white-balance adjustment is created and a threshold value is set, in a manner similar to that described above, based upon the histogram created (step 82).

Revised gain coefficients are calculated using the current target value (step 83). It goes without saying that initially the revised gain coefficients are calculated using the ideal value that has been set.

White balance is adjusted using the revised gain coefficients calculated and a histogram of the subject image that has undergone the white-balance adjustment is created (step 84).

The target value is lowered until the peak value of the histogram falls below the threshold value (step 86). Calculation of the revised gain coefficients (step 83) and creation of a histogram (step 84) continue using the lowered target value.

If the peak value of the histogram falls below the threshold value ("YES" at step 85), the currently prevailing revised gain coefficients are decided upon as the final revised gain coefficients (step 87).

Figure 25:
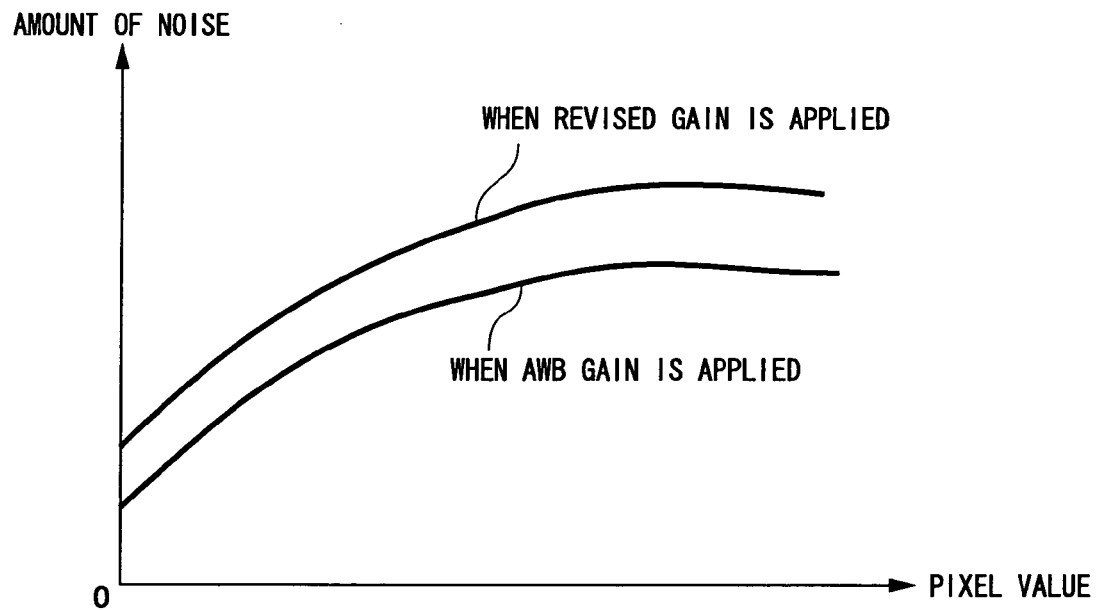
FIG. 25 illustrates amount of noise in image data corrected by revised gain and by basic gain according to the fourth embodiment.

FIG. 25 illustrates an example of amount of noise.

FIG. 25 shows amount of noise in image data that has undergone the white-balance adjustment in a case where the basic gain coefficients in automatic white balance (AWB) have been applied, and amount of noise in image data that has undergone the white-balance adjustment in a case where the revised gain coefficients have been applied. It can be understood that noise parameters for lowering noise are output from the noise parameter circuit in accordance with the case where basic gain coefficients or revised gain coefficients are applied.

Figure 26:
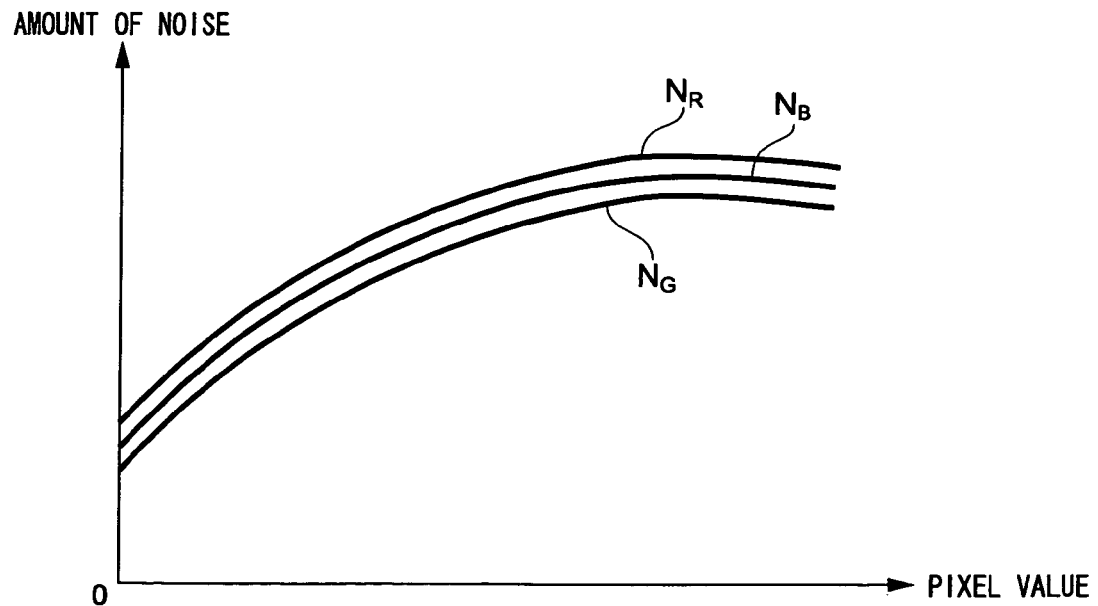
FIG. 26 illustrates amount of noise in image data corrected by revised gain.

FIG. 26 illustrates an example in which the amount of noise changes for each of the colors R, G, B. Since amount of noise conforming to each of R, G, B is used, noise specific to each color can be reduced.

Figure 27:
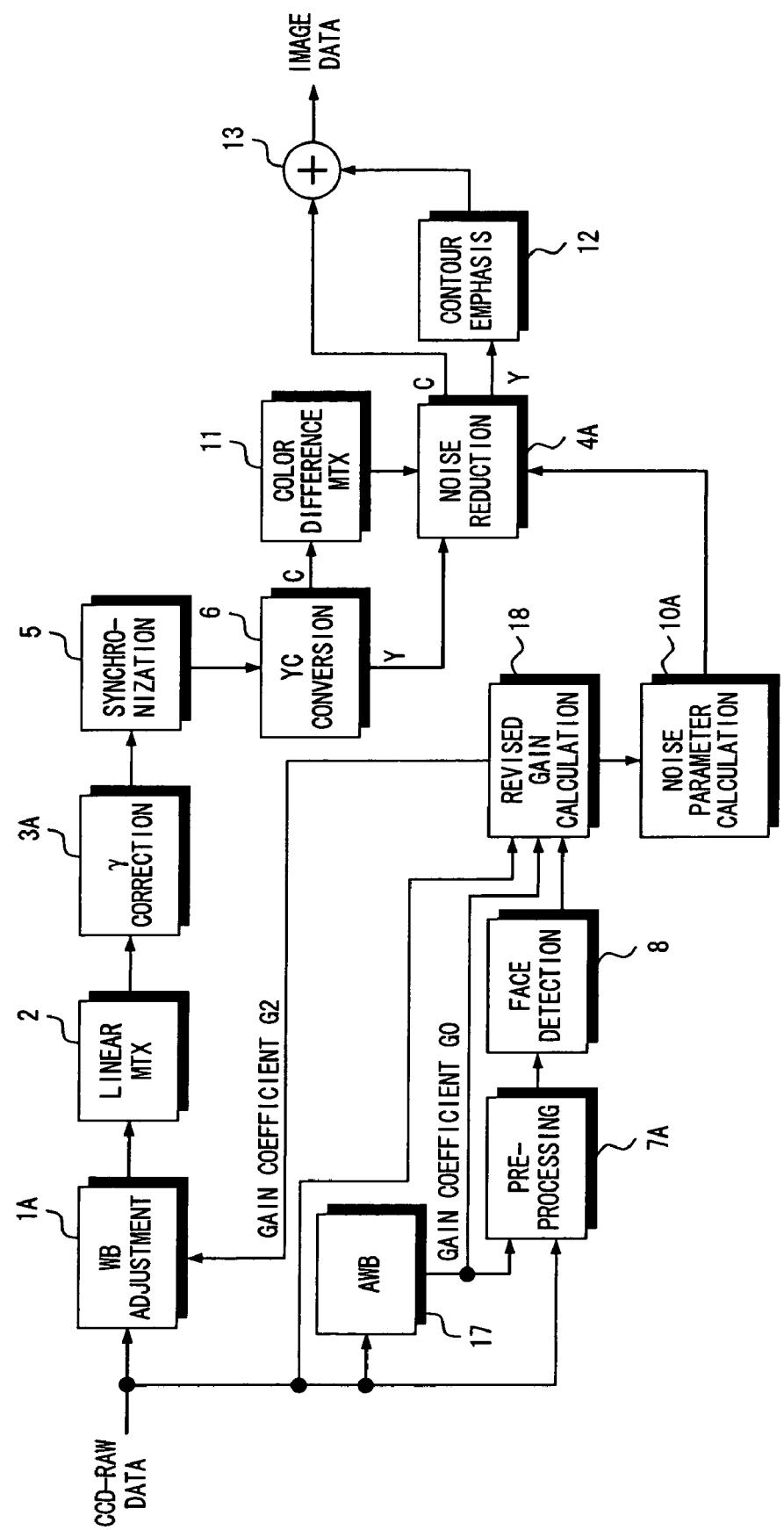
FIG. 27 is a block diagram illustrating part of the electrical structure of an image processing apparatus according to a fifth embodiment.
Figure 28:
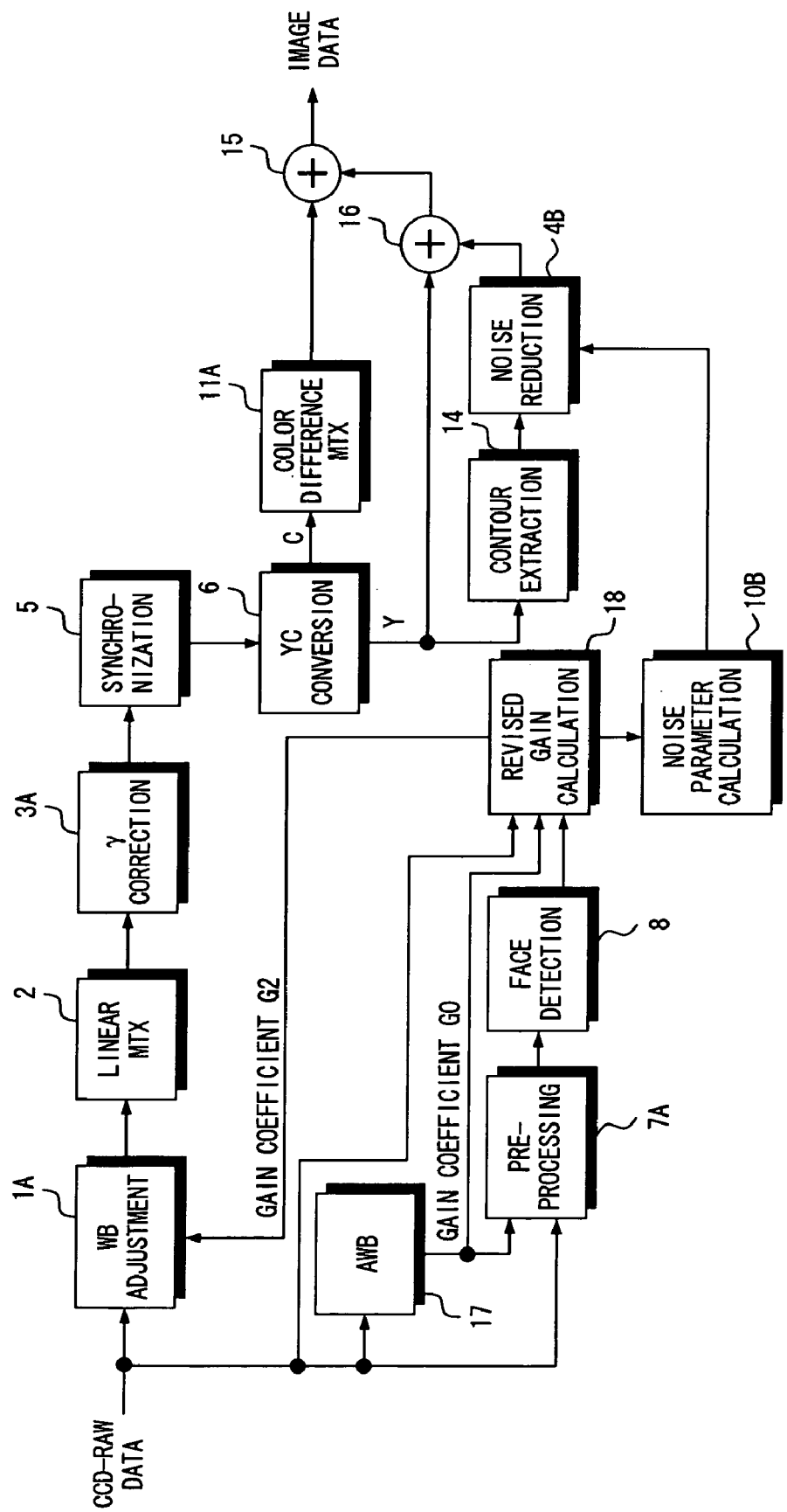
FIG. 28 is a block diagram illustrating part of the electrical structure of an image processing apparatus according to a sixth embodiment.

FIGS. 27 and 28 are block diagrams illustrating parts of the electrical structures of image processing apparatuses according to fifth and sixth embodiments, respectively.

FIG. 27 illustrates the result of combining the image processing apparatus shown in FIG. 14 and the image processing apparatus shown in FIG. 22. Components in FIG. 27 identical with those shown in FIG. 14 or FIG. 22 are designated by like reference characters and need not be described again.

With the image processing apparatus illustrated in FIG. 27, the white-balance adjusting circuit 1A is capable of making the brightness of the face image and the brightness of the overall image of the subject appropriate and of reducing noise in luminance data.

FIG. 28 illustrates the result of combining the image processing apparatus shown in FIG. 19 and the image processing apparatus shown in FIG. 22. Components in FIG. 28 identical with those shown in FIG. 19 or FIG. 22 are designated by like reference characters and need not be described again.

With the image processing apparatus illustrated in FIG. 28, the white-balance adjusting circuit 1A is capable of making the brightness of the face image and the brightness of the overall image of the subject appropriate and of suppressing noise in contour components.

As many apparently widely different embodiments of the present invention can be made without departing from the spirit and scope thereof, it is to be understood that the invention is not limited to the specific embodiments thereof except as defined in the appended claims.

What is claimed is:

1. An image correction apparatus comprising:
   a brightness correcting device for correcting subject image data, which represents the image of a subject, in such a manner that the brightness of a target image, which is one portion within the image of the subject, will take on a prescribed target value;
   a noise reduction parameter deciding device for deciding a noise reduction parameter based upon an amount of correction applied in said brightness correcting device;
   a noise reducing device for applying noise reduction processing to the subject image data, which has been corrected by said brightness correcting device, based upon the noise reduction parameter decided by said noise reduction parameter deciding device;
   wherein said brightness correcting device is a gamma correction circuit for applying a gamma correction to the subject image data based upon a revised gamma correction curve according to which the brightness of the target image takes on the prescribed target value;
   a first histogram calculating device for calculating a histogram of image data obtained in a case where the target image data has been subjected to gamma correction using a basic gamma correction curve;
   a threshold value deciding device for deciding a threshold value based upon the histogram calculated by said first histogram calculating device:
   a revised gamma correction curve calculating device for calculating a revised gamma correction curve based upon an ideal value of brightness of the target image:
   a second histogram calculating device for calculating a histogram of image data obtained in a case where the target image data has been subjected to gamma correction using the revised gamma correction curve calculated by said revised gamma correction curve calculating device; and
   a loop control device for executing processing that lowers the level of the ideal value until a peak value of the histogram that is calculated by said second histogram calculating device falls below the threshold value decided by said threshold value deciding device, and controlling said revised gamma correction curve calculating device and said second histogram calculating device so as to repeat revised correction curve calculation processing that is based upon the ideal value whose level has been lowered and gamma correction processing that uses the revised correction curve;
   wherein the ideal value at which the peak value of the histogram falls below the threshold value calculated by said second histogram calculating device is adopted as the prescribed target value of brightness of the target image, and the subject image data is subjected to the gamma correction based upon the revised correction curve according to which the brightness of the target image takes on the prescribed target value.

2. The apparatus according to claim 1, wherein said noise reduction parameter deciding device decides the noise reduction parameter based upon amount of noise possessed by the subject image data and the amount of correction applied in said brightness correcting device.

3. The apparatus according to claim 1, further comprising a target image detecting device for detecting the target image from within the image of the subject;
   wherein said brightness correcting device corrects the subject image data in such a manner that the brightness of the target image detected by said target image detecting device will take on the appropriate target value.

4. An image correction apparatus comprising:
   a brightness correcting device for correcting subject image data which represents the image of a subject, in such a manner that the brightness of a target image, which is one portion within the image of the subject, will take on a prescribed target value;

a noise reduction parameter deciding device for deciding a noise reduction parameter based upon an amount of correction applied in said brightness correcting device; and a noise reducing device for applying noise reduction processing to the subject image data, which has been corrected by said brightness correcting device, based upon the noise reduction parameter decided by said noise reduction parameter deciding device;

wherein said brightness correcting device is a gamma correction circuit for applying a gamma correction to the subject image data based upon a revised gamma correction curve according to which the brightness of the target image takes on the prescribed target value; and wherein said noise reduction parameter deciding device includes:

a differentiating circuit for calculating differential data by differentiating the revised correction curve; and a multiplying circuit for calculating the noise reduction parameter by multiplying the differential data, which has been calculated by said differentiating circuit, by data indicating amount of noise possessed by the subject image data prevailing immediately prior to the gamma correction.

5. The apparatus according to claim 4, wherein said noise reduction parameter deciding device decides the noise reduction parameter based upon amount of noise possessed by the subject image data and the amount of correction applied in said brightness correcting device.

6. The apparatus according to claim 4, further comprising a target image detecting device for detecting the target image from within the image of the subject;

wherein said brightness correcting device corrects the subject image data in such a manner that the brightness of the target image detected by said target image detecting device will take on the appropriate target value.

7. An image correction method comprising the steps of:

correcting subject image data, which represents the image of a subject, in such a manner that the brightness of a target image, which is one portion within the image of the subject, will take on a prescribed target value;

deciding a noise reduction parameter based upon an amount of correction in the correction of subject image data;

applying noise reduction processing to the corrected subject image data based upon the noise reduction parameter decided;

applying a gamma correction using a gamma correction circuit to the subject image data based upon a revised gamma correction curve according to which the brightness of the target image takes on the prescribed target value;

calculating a histogram using a first histogram calculating device of image data obtained in a case where the target image data has been subjected to gamma correction using a basic gamma correction curve;

deciding a threshold value based upon the histogram calculated;

calculating a revised gamma correction curve based upon an ideal value of brightness of the target image;

calculating a histogram using a second histogram calculating device of image data obtained in a case where the target image data has been subjected to gamma correction using the revised gamma correction curve calculated; and executing processing that lowers the level of the ideal value until a peak value of the histogram that is calculated falls below the threshold value decided, and repeating revised correction curve calculation processing that is based upon the ideal value whose level has been lowered and gamma correction processing that uses the revised correction curve;

wherein the ideal value at which the peak value of the histogram falls below the threshold value calculated is adopted as the prescribed target value of brightness of the target image, and the subject image data is subjected to the gamma correction based upon the revised correction curve according to which the brightness of the target image takes on the prescribed target value.

8. An image correction method comprising the steps of:

correcting subject image data, which represents the image of a subject, in such a manner that the brightness of a target image, which is one portion within the image of the subject, will take on a prescribed target value;

deciding a noise reduction parameter based upon an amount of correction in the correction of subject image data; and applying noise reduction processing to the corrected subject image data based upon the noise reduction parameter decided applying a gamma correction using a gamma correction circuit to the subject image data based upon a revised gamma correction curve according to which the brightness of the target image takes on the prescribed target value;

wherein said step of deciding a noise reduction parameter includes:

calculating differential data by a differentiating circuit by differentiating the revised correction curve; and calculating the noise reduction parameter by a multiplying circuit by multiplying the differential data, which has been calculated, by data indicating amount of noise possessed by the subject image data prevailing immediately prior to the gamma correction.

* * * * *